US012651317B2

(12) United States Patent
Kim et al.

(10) Patent No.: US 12,651,317 B2
(45) Date of Patent: Jun. 9, 2026

(54) IMAGE PROCESSING METHOD AND DEVICE FOR REMOVING PERCEPTIBLE NOISE FROM IMAGE

(71) Applicant: SAMSUNG ELECTRONICS CO., LTD., Suwon-si (KR)

(72) Inventors: Moonhee Kim, Suwon-si (KR); Bongjoe Kim, Suwon-si (KR); Sanghun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 240 days.

(21) Appl. No.: 18/607,014

(22) Filed: Mar. 15, 2024

(65) Prior Publication Data

US 2024/0221131 A1     Jul. 4, 2024

Related U.S. Application Data

(63) Continuation of application No. PCT/KR2022/017997, filed on Nov. 15, 2022.

(30) Foreign Application Priority Data

Nov. 16, 2021     (KR) ........................ 10-2021-0158044

(51) Int. Cl.
*G06K 9/00*          (2022.01)
*G06F 18/15*         (2023.01)
               (Continued)
(52) U.S. Cl.
CPC ................ *G06T 5/70* (2024.01); *G06F 18/15* (2023.01); *G06T 5/50* (2013.01); *G06T 5/60* (2024.01);
               (Continued)

(58) Field of Classification Search
CPC ......... G06T 3/40; G06T 3/403; G06T 3/4046; G06T 5/00; G06T 5/10; G06T 5/20;
               (Continued)

(56) References Cited

U.S. PATENT DOCUMENTS 5,764,307 A   *   6/1998  Ozcelik .................... H04N 5/21
                                                   382/261
7,570,833 B2      8/2009  Lee
               (Continued)

FOREIGN PATENT DOCUMENTS

JP        2013-41565 A      2/2013
KR        10-0721543 B1     5/2007
               (Continued)

OTHER PUBLICATIONS

Extended European Search Report dated Nov. 28, 2024, issued by the European Patent Office in European Application No. 22896025.8.

(Continued)

*Primary Examiner* — Eric Rush
(74) *Attorney, Agent, or Firm* — Sughrue Mion, PLLC

(57)          ABSTRACT

The present disclosure relates to an image processing method and device for removing perceptible noise from an image. The disclosed image processing method includes: obtaining a noise-removed image from an image; obtaining removed noise from a difference between the image and the noise-removed image; obtaining a statistical feature of the noise-removed image and a statistical feature of the noise; determining a noise feature regarding whether noise of a pixel is perceptible noise or a perceptible detail, based on the statistical feature of the noise-removed image and the statistical feature of the noise; and performing a process of removing the perceptible noise from the image based on the noise feature of the pixel.

15 Claims, 18 Drawing Sheets

ORIGINAL IMAGE    NOISE-REMOVED IMAGE    REMOVED NOISE    STATISTICAL FEATURE    NOISE FEATURE    PERCEPTIBLE-NOISE-REMOVED IMAGE

(51) Int. Cl.

| | |
|---|---|
| *G06T 5/50* | (2006.01) |
| *G06T 5/60* | (2024.01) |
| *G06T 5/70* | (2024.01) |
| *G06T 7/00* | (2017.01) |
| *G06T 7/13* | (2017.01) |
| *G06V 10/30* | (2022.01) |
| *G06V 10/44* | (2022.01) |
| *G06V 10/77* | (2022.01) |
| *G06V 10/82* | (2022.01) |

(52) U.S. Cl.

CPC .............. *G06T 7/0002* (2013.01); *G06T 7/13* (2017.01); *G06V 10/30* (2022.01); *G06V 10/44* (2022.01); *G06V 10/77* (2022.01); *G06V 10/82* (2022.01); *G06T 2207/20012* (2013.01); *G06T 2207/20081* (2013.01); *G06T 2207/20084* (2013.01); *G06T 2207/20172* (2013.01); *G06T 2207/20192* (2013.01); *G06T 2207/20212* (2013.01); *G06T 2207/30168* (2013.01)

(58) Field of Classification Search

CPC .... G06T 5/40; G06T 5/50; G06T 5/60; G06T 5/70; G06T 5/73; G06T 5/75; G06T 7/0002; G06T 7/10; G06T 7/11; G06T 7/12; G06T 7/13; G06T 7/136; G06T 2207/20004; G06T 2207/20008; G06T 2207/20012; G06T 2207/20024; G06T 2207/20081; G06T 2207/20084; G06T 2207/20172; G06T 2207/20182; G06T 2207/20192; G06T 2207/20204; G06T 2207/20212; G06T 2207/20221; G06T 2207/20224; G06T 2207/30168; G06V 10/20; G06V 10/30; G06V 10/36; G06V 10/40; G06V 10/42; G06V 10/44; G06V 10/454; G06V 10/50; G06V 10/70; G06V 10/72; G06V 10/764; G06V 10/77; G06V 10/771; G06V 10/7715; G06V 10/80; G06V 10/803; G06V 10/82; G06V 10/98; G06V 10/993; G06N 3/02; G06N 3/0464; G06N 3/08; G06N 3/09; G06F 18/10; G06F 18/15; G06F 18/20; G06F 18/213; G06F 18/214; G06F 18/24; G06F 18/2413; G06F 18/25; G06F 18/251; G06F 2218/04

USPC ....... 382/100, 155–157, 159, 160, 190, 195, 382/199, 201, 224, 228, 254, 260, 261, 382/266–275, 282; 348/241, 607, 618, 348/622, 625

See application file for complete search history.

(56) References Cited

U.S. PATENT DOCUMENTS

| | | | | |
|---|---|---|---|---|
| 7,869,656 | B2 | 1/2011 | Kim | |
| 9,531,922 | B2 * | 12/2016 | Ohno | H04N 23/81 |
| 9,558,537 | B2 * | 1/2017 | Wu | G06T 5/70 |
| 9,607,238 | B2 * | 3/2017 | Hong | G06T 5/00 |
| 10,949,952 | B2 | 3/2021 | Huang et al. | |
| 11,093,780 | B2 | 8/2021 | Yoo et al. | |
| 2021/0104021 | A1 * | 4/2021 | Sohn | G06N 3/045 |

FOREIGN PATENT DOCUMENTS

| | | | |
|---|---|---|---|
| KR | 10-2007-0056756 | A | 6/2007 |
| KR | 10-2010-0071834 | A | 6/2010 |
| KR | 10-0975823 | B1 | 8/2010 |
| KR | 10-0996281 | B1 | 11/2010 |
| KR | 10-1791573 | B1 | 10/2017 |
| KR | 10-2020-0099923 | A | 8/2020 |
| KR | 10-2172234 | B1 | 10/2020 |
| KR | 10-2021-0061298 | A | 5/2021 |
| KR | 10-2288280 | B1 | 8/2021 |
| WO | 99/46731 | A1 | 9/1999 |

OTHER PUBLICATIONS

Fan et al., "Adaptive Texture-Preserving Denoising Method Using Gradient Histogram and Nonlocal Self-Similarity Priors", IEEE Transactions on Circuits and Systems for Video Technology, 2019, vol. 29, No. 11, pp. 3222-3235 (14 pages total).

Liu et al., "Automatic Estimation and Removal of Noise from a Single Image", IEEE Transactions on Pattern Analysis and Machine Intelligence, IEEE Computer Society, 2008, vol. 30, No. 2, pp. 299-314 (16 pages total).

Son et al., "Layer-Based Approach for Image Pair Fusion", IEEE Transactions on Image Processing, 2016, vol. 25, No. 6, pp. 2866-2881 (16 pages total).

Voloshynovskiy, Sviatoslav et al., "A stochastic Approach to Content Adaptive Digital Image Watermarking", International workshop on information hiding. Springer, Berlin, Heidelberg, 1999. (26 pages total).

International Search Report (PCT/ISA/210) issued Feb. 23, 2023 by the International Searching Authority in International Patent Application No. PCT/KR2022/017997.

Written Opinion (PCT/ISA/237) issued Feb. 23, 2023 by the International Searching Authority in International Patent Application No. PCT/KR2022/017997.

Kim, Sung Jun et al., "Deep Network for Detail Enhancement in Image Denoising", Journal of Korea Multimedia Society, vol. 22, No. 6, Jun. 2019, pp. 646-654. (10 pages total).

Kim, Tae-Hyeon, "A Technique for Dynamic Update of Network Parameter for Image Restoration", Broadcasting and Media Magazine, 2020, vol. 25, No. 2, pp. 27-35. (11 pages total).

Office Action dated Dec. 16, 2025, issued by Korean Ministry of Intellectual Property in Korean Application No. 10-2021-0158044.

* cited by examiner

FIG. 11

IMAGE PROCESSING METHOD AND DEVICE FOR REMOVING PERCEPTIBLE NOISE FROM IMAGE

CROSS-REFERENCE TO RELATED APPLICATIONS

This application is a by-pass continuation of International Application No. PCT/KR2022/017997, filed on Nov. 15, 2022, which is based on and claims priority to Korean Patent Application No. 10-2021-0158044, filed on Nov. 16, 2021, in the Korean Intellectual Property Office, the disclosures of which are incorporated by reference herein in their entireties.

BACKGROUND

1. Field

The disclosure relates to an image processing method and device, and more specifically, to a method and device for detecting and removing perceptible noise from an image.

2. Description of Related Art

With recent developments in display and communication technologies, demand for higher-quality images is increasing. Accordingly, various methods have been used to efficiently remove artifacts from images containing artifacts such as noise.

An image processing device may detect noise in an image by analyzing the image according to predetermined rules, and remove the noise by applying a filter to the image. However, according to this method, even features that are recognized as perceptible details by a human visual system are collectively removed according to the rules, which may damage the details of the image. An image processing device may also remove noise from an image by applying an artificial intelligence model that is trained with a training database (DB), to the image. However, according to this method, when the DB that is used for training the artificial intelligence model, and noise features of the image from which noise is to be removed are different from each other, the artificial intelligence model may make a decision that is different from that of the human visual system when distinguishing between noise and details in the image. Thus, an issue may occur in which noise is boosted or features recognized as perceptible details are removed, which is damaging to the details of the image.

Therefore, there is a need for a technique for detecting and removing noise by reflecting perceptible features of an image in consideration of the human visual system.

SUMMARY

According to an aspect of the disclosure, an image processing method includes: obtaining a noise-removed image from an image; obtaining removed noise from a difference between the image and the noise-removed image; obtaining a statistical feature of the noise-removed image and a statistical feature of the removed noise; identifying a noise feature based on the statistical feature of the noise-removed image and the statistical feature of the removed noise, wherein the noise feature indicates whether the removed noise of a pixel of the image is perceptible noise or perceptible detail; and removing perceptible noise from the image based on the noise feature.

The obtaining the noise-removed image may include filtering the image based on a predetermined rule.

The obtaining the noise-removed image may include applying, to the image, an artificial intelligence model configured to remove noise.

The obtaining the statistical feature of the noise-removed image and the statistical feature of the removed noise may include: identifying the pixel in the image; identifying an area in the noise-removed image corresponding to a position of the pixel and an area in the removed noise corresponding to the position of the pixel; and obtaining a statistical feature of the area in the noise-removed image and a statistical feature of the area in the removed noise.

The identifying the noise feature may include: based on a difference between the statistical feature of the noise-removed image and the statistical feature of the removed noise being within a predetermined range, identifying the noise feature of the pixel as perceptible detail; and based on the difference between the statistical feature of the noise-removed image and the statistical feature of the removed noise being outside the predetermined range, identifying the noise feature of the pixel as perceptible noise.

The identifying the noise feature may include obtaining a feature parameter indicating a degree to which the noise feature of the pixel is perceptible noise or perceptible detail, based on the statistical feature of the noise-removed image and the statistical feature of the removed noise.

The identifying the noise feature may include: identifying whether the pixel corresponds to an edge, based on an edge map of the image; and based on the pixel corresponding to the edge, identifying the noise feature of the pixel as perceptible detail.

The identifying the noise feature may include identifying the noise feature based on at least one of a size of a screen on which the image is reproduced, a brightness of the screen on which the image is reproduced, or a viewing distance of the image.

The identifying the noise feature may include: obtaining directionality of the pixel by analyzing the area in the noise-removed image and the area in the removed noise; and identifying the noise feature based on the directionality of the pixel.

The removing perceptible noise may include: based on identifying the noise feature as perceptible noise, replacing the pixel with a corresponding pixel of the noise-removed image.

The removing perceptible noise may include combining the image with the noise-removed image based on the feature parameter.

The removing perceptible noise may include: based on identifying the noise feature of the pixel as perceptible noise, applying, to the pixel, a first artificial intelligence model configured to process perceptible noise; and based on identifying the noise feature of the pixel as perceptible detail, applying, to the pixel, a second artificial intelligence model configured to process perceptible detail.

The removing perceptible noise may include: obtaining a first modified image by applying, to the image, a first artificial intelligence model configured to process perceptible noise; obtaining a second modified image by applying, to the image, a second artificial intelligence model configured to process perceptible detail; and combining the first modified image with the second modified image based on the feature parameter of the pixel.

According to an aspect of the disclosure, an image processing device includes: at least one memory storing one or more instructions; and at least one processor configured to execute the one or more instructions, wherein the at least one processor is configured to execute the one or more instructions to cause the image processing device to: obtain a noise-removed image from an image, obtain removed noise from a difference between the image and the noise-removed image, obtain a statistical feature of the noise-removed image and a statistical feature of the removed noise, identify a noise feature based on the statistical feature of the noise-removed image and the statistical feature of the removed noise, wherein the noise feature indicates whether the removed noise of a pixel of the image is perceptible noise or perceptible detail, and remove perceptible noise from the image based on the noise feature of the pixel.

According to an aspect of the disclosure, a non-transitory computer readable medium having instructions stored therein, which when executed by at least one processor cause the at least one processor to execute an image processing method including: obtaining a noise-removed image from an image; obtaining removed noise from a difference between the image and the noise-removed image; obtaining a statistical feature of the noise-removed image and a statistical feature of the removed noise; identifying a noise feature based on the statistical feature of the noise-removed image and the statistical feature of the removed noise, wherein the noise feature indicates whether the removed noise of a pixel of the image is perceptible noise or perceptible detail; and removing perceptible noise from the image based on the noise feature.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 is a diagram illustrating an operation, performed by an artificial intelligence model training device, of training artificial intelligence models for processing perceptible noise and a perceptible detail of an image, according to an embodiment;

DETAILED DESCRIPTION

Figure 1:
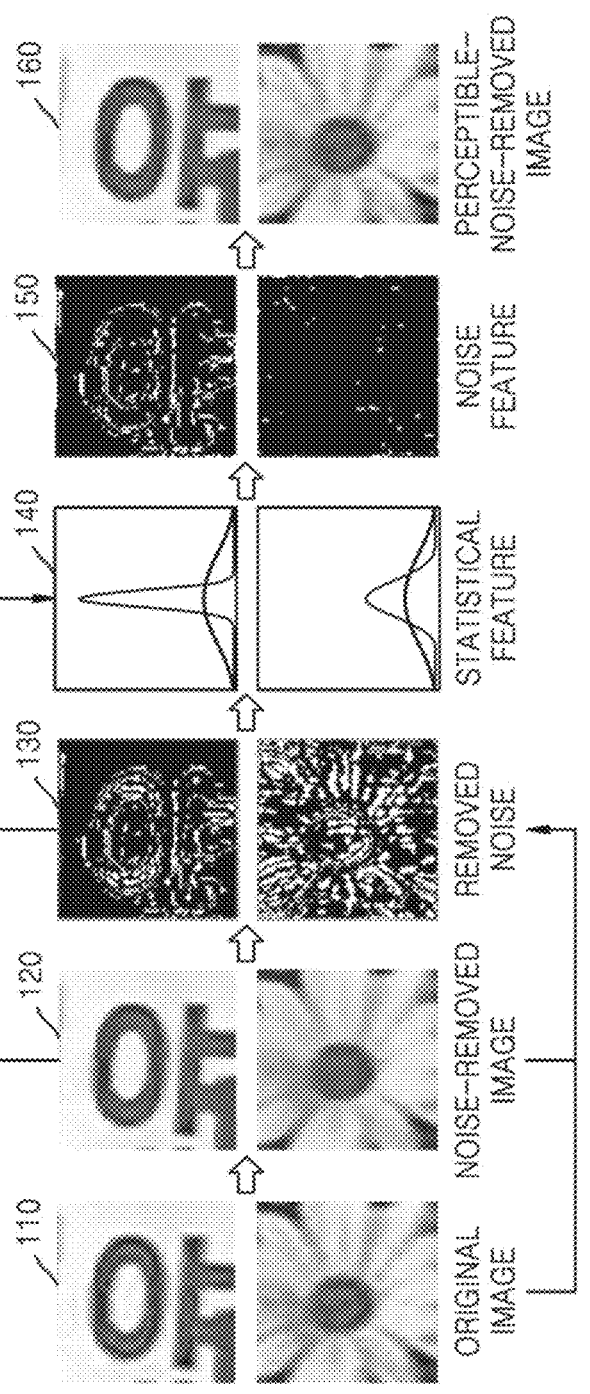
FIG. 1 is a diagram illustrating an operation of an image processing device for removing perceptible noise, according to an embodiment.

Hereinafter, various embodiments of the disclosure will be described with reference to the accompanying drawings. However, it should be understood that the disclosure is not limited to particular embodiments but also includes various modifications, equivalents, and/or alternatives thereof. With regard to the description of the drawings, similar reference numerals may be used to refer to similar elements.

As used herein, the expressions "have, "may have", "include", "may include", and other conjugates refer to the existence of a corresponding feature (e.g., a numerical value, a function, an operation, or a component such as a part), and do not exclude the existence of additional features.

As used herein, expressions such as "A or B", "at least one of A or/and B", or "one or more of A or/and B" may include all possible combinations of the listed items. For example, "A or B", "at least one of A and B", or "one or more of A or B" may refer to (1) at least one A, (2) at least one B, or (3) both at least one A and at least one B.

In the present disclosure, expressions such as "first" or "second" are used to describe various elements regardless of their order and/or importance and to discriminate one element from other elements, but are not limited to the corresponding elements. For example, a first user device and a second user device may indicate different user devices regardless of their order or importance. For example, without departing from the scope as described herein, a first element may be referred to as a second element, and similarly, a second element may be referred to as a first element.

It is to be understood that an element (e.g., a first element) described as being "operatively or communicatively coupled with/to" or "connected to" another element (e.g., a second element) may be directly connected to the other element or may be connected via another element (e.g., a third element). On the other hand, that an element (e.g., a first element) is "directly coupled" or "directly connected" to another element (e.g., a second element) may mean that there is no other element (e.g., a third element) between the other elements.

As used herein, the expression "configured to" may be interchangeably used with, for example, "suitable for", "having the capacity to", "designed to", "adapted to", "made to", or "capable of", according to a situation. The expression "configured to" may not imply only "specially designed to" in a hardware manner. Instead, in a certain circumstance, the expression "a device configured to" may mean that the device is "capable of" together with another device or components. For example, "a processor configured (or set) to perform A, B, and C" may imply a dedicated processor (e.g., an embedded processor) for performing a corresponding operation or a general-purpose processor (e.g., central processing unit (CPU) or an application processor (AP)) capable of performing corresponding operations by executing one or more software programs stored in a memory.

Terms used herein are for describing a particular embodiment and are not intended to limit the scope of other embodiments. The singular expression may also include the plural meaning as long as it is not inconsistent with the context. All the terms used herein, including technical and scientific terms, may have the same meanings as those generally understood by those of skill in the art. The terms as defined in a general dictionary may be interpreted as the same meanings as the contextual meanings of a related technology, and are not interpreted as ideal or excessively formal meanings unless defined clearly in the present disclosure. In some cases, even the terms defined in the present disclosure should not be interpreted to exclude the embodiments of the present disclosure.

Electronic devices according to various embodiments of the present disclosure may include, for example, at least one of a smart phone, a tablet personal computer, a mobile phone, a video phone, an e-book reader, a desktop personal computer (PC), a laptop PC, a netbook computer, a workstation, a server, a personal digital assistant (PDA), a portable multimedia player (PMP), an MP3 player, a mobile medical device, a camera, or a wearable device. According to various embodiments, the wearable device may include at least one of an accessory-type device (e.g., a watch, a ring, a bracelet, an anklet, a necklace, spectacles, a contact lens, or a head-mounted device (HMD)), a textile- or garment-integrated device (e.g. an electronic garment), a body attachment device (e.g., a skin pad or a tattoo), or a bioimplantable device (e.g., an implantable circuit).

In some embodiments, the electronic device may be a home appliance. The home appliance may include, for example, at least one of a television (TV), a digital video disk (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g. Xbox™ or PlayStation™), an electronic dictionary, an electronic key, a camcorder, or an electronic picture frame.

In another embodiment, the electronic device may include at least one of various medical devices (e.g., various portable medical measuring devices (a glucose meter, a heart rate meter, a blood pressure measuring device, or a body temperature measuring device), a magnetic resonance angiography (MRA) device, a magnetic resonance imaging (MRI) device, a computed tomography (CT) device, a camera, or an ultrasonic device), a navigation device, a global navigation satellite system (GNSS), an event data recorder (EDR), a flight data recorder (FDR), an automotive infotainment device, marine electronic equipment (e.g., a marine navigation system or a gyrocompass), avionics, a security device, a vehicle head unit, an industrial or household robot, a drone, an automated teller machine (ATM) in a financial institution, a point-of-sales (POS) device in a shop, or an Internet-of-Things (IoT) device (e.g., a light bulb, various sensors, a sprinkler device, a fire alarm, a thermostat, a street light, a toaster, exercise equipment, a hot-water tank, a heater, or a boiler).

According to an embodiment, the electronic device may include at least one of furniture, a part of a building/structure, an electronic board, an electronic signature receiving device, a projector, or various measuring devices (e.g., a water, electricity, gas, or radio wave measuring device).

In various embodiments, the electronic device may be any one or a combination of one or more of the various devices described above. The electronic device according to an embodiment may be a flexible electronic device. In addition, the electronic device according to an embodiment of the present disclosure is not limited to the devices described above, and may include new devices in compliance with the development of technologies.

An artificial intelligence (AI) system is a computer system that implements human-level intelligence, and allows a machine to learn by itself, make decisions, and become smarter, unlike an existing rule-based smart system. As the AI system is more frequently used, the recognition rate of the AI system is improved and accurately understands a user's preference, and accordingly, the existing rule-based smart systems have gradually been replaced with deep-learning-based AI systems.

AI technology includes machine-learning (e.g., deep-learning) technology that uses an algorithm for classifying/learning features of input data by itself, and element technologies for copying cognition and decision functions of the human brain through a machine-learning algorithm.

Machine learning is an algorithm technology that classifies/learns characteristics of input data on its own. The element technologies may include at least one of language understanding technology for recognizing human languages/characters, visual understanding technology for recognizing objects like human vision, inference/prediction technology for determining information and performing logical inference and prediction, knowledge representation technology for processing human experience information to knowledge data, and motion control technology for controlling autonomous driving of vehicles or the motion of robots. Linguistic understanding is a technique for recognizing, and applying/processing human languages/character systems, and includes natural language processing, machine translation, a dialogue system, question answering, speech recognition/synthesis, etc.

Functions related to AI according to the present disclosure may be performed by a processor and a memory. The processor may include one or more processors. In this case, the one or more processors may be a general-purpose processor, such as a CPU, an application processor (AP), or a digital signal processor (DSP), a dedicated graphics processor, such as a graphics processing unit (GPU) or a vision processing unit (VPU), or a dedicated AI processor, such as a neural processing unit (NPU). The one or more processors may perform control to process input data according to predefined operation rules or an AI model stored in the memory. Alternatively, in a case in which the one or more processors are dedicated AI processors, the dedicated AI processor may be designed with a hardware structure specialized for processing a particular AI model.

The predefined operation rules or the AI model may be generated via a training process. Here, being generated via a training process may mean that predefined operation rules or AI model set to perform desired characteristics (or purposes), is generated by training a basic AI model by using a learning algorithm that utilizes a large amount of training data. The training process may be performed by a device itself on which AI according to the present disclosure is performed, or by a separate server and/or system. Examples of learning algorithms may include, for example, supervised learning, unsupervised learning, semi-supervised learning, and reinforcement learning, but are not limited thereto.

The AI model may include a plurality of neural network layers. Each of the neural network layers may have a plurality of weight values, and may perform a neural network arithmetic operation via an arithmetic operation between an arithmetic operation result of a previous layer and the plurality of weight values. The plurality of weight values in each of the neural network layers may be optimized as a result of training the AI model. For example, the plurality of weight values may be updated to reduce or minimize a loss or cost value obtained by the AI model during a training process. The artificial neural network may include, for example, a deep neural network (DNN) and may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, or the like, but is not limited thereto.

Hereinafter, the present disclosure will be described in detail with reference to the accompanying drawings.

FIG. 1 is a diagram illustrating an operation of an image processing device 1000 for removing perceptible noise, according to an embodiment.

Noise included in an image may not be perceived as noise, but may be perceived as a detail of an object represented in the image, depending on the position of the noise. The reason is that, when the human visual system recognizes various pieces of information in a visual area, all information is not equally perceived but statistical information is perceived. That is, when noise has a feature similar to a statistical feature of an area surrounding the noise, the noise is perceived as a detail rather than noise.

Thus, according to various embodiments of the present disclosure, a statistical feature of noise in an image and a statistical feature of an area surrounding the noise may be analyzed, and when the statistical features are similar to each other, the noise may be classified as a perceptible detail, and when the features are different from each other, the noise may be classified as perceptible noise. By removing only noise classified as perceptible noise without removing noise classified as a perceptible detail, it is possible to obtain a noise-removed image while effectively suppressing damage to the details of the image.

Referring to FIG. 1, the image processing device 1000 may obtain a noise-removed image 120 from an original image 110. In an embodiment, the image processing device 1000 may obtain the noise-removed image 120 by filtering the original image 110 based on a predetermined rule. In another embodiment, the image processing device 1000 may obtain the noise-removed image 120 by applying a predetermined AI model to the original image 110.

The image processing device 1000 may obtain removed noise 130, from a difference between the original image 110 and the noise-removed image 120.

The image processing device 1000 may obtain a statistical feature 140 of the noise-removed image 120, from the noise-removed image 120 and the removed noise 130. In various embodiments, the image processing device 1000 may obtain a statistical feature of the noise-removed image 120, and a statistical feature of the removed noise 130. For example, the image processing device 1000 may obtain a variance of the noise-removed image 120 and a variance of the removed noise 130. In an embodiment, the image processing device 1000 may frequency-convert the noise-removed image 120 and the removed noise 130, and analyze statistical features of images obtained as a result of the frequency-converting.

Based on the statistical feature 140 of the image, the image processing device 1000 may identify a noise feature 150 indicating whether the removed noise 130, removed from the original image 110, is perceptible noise or a perceptible detail. In an embodiment, the noise feature 150 may indicate whether the removed noise 130 of each pixel is perceptible noise or a perceptible detail. In another embodiment, the noise feature 150 may be a feature parameter indicating a degree to which the removed noise 130 of each pixel corresponds to perceptible noise or a perceptible detail.

The image processing device 1000 may obtain a perceptible-noise-removed image 160 by performing a process of removing perceptible noise based on the noise feature 150. In an embodiment, the image processing device 1000 may obtain the perceptible-noise-removed image 160 by using the noise-removed image 120 when the noise feature 150 is determined as perceptible noise, and by using the original image 110 when the noise feature 150 is determined as a perceptible detail. In another embodiment, the image processing device 1000 may obtain the perceptible-noise-removed image 160 by combining the original image 110 with the noise-removed image 120 based on a feature parameter.

In various embodiments, the image processing device 1000 may perform a process of removing perceptible noise by using an AI model. In various embodiments, the image processing device 1000 may perform a process of removing perceptible noise by using a first AI model for processing perceptible noise and a second AI model for processing a perceptible detail. The first AI model and the second AI model may be trained through a training database (DB) including perceptible-noise images and a training DB including perceptible-detail images, respectively. The training DBs may be generated by a noise feature determination method according to various embodiments of the present disclosure.

In an embodiment, the image processing device 1000 may obtain the perceptible-noise-removed image 160 by applying the first AI model to the original image 110 when the noise feature 150 is determined as perceptible noise, and by applying the second AI model to the original image 110 when the noise feature 150 is determined as a perceptible detail. In another embodiment, the image processing device 1000 may obtain a first modified image and a second modified image by applying the first AI model and the second AI model to the original image 110, respectively, and obtain the perceptible-noise-removed image 160 by combining the first modified image with the second modified image based on a feature parameter representing the noise feature 150.

Figure 2:
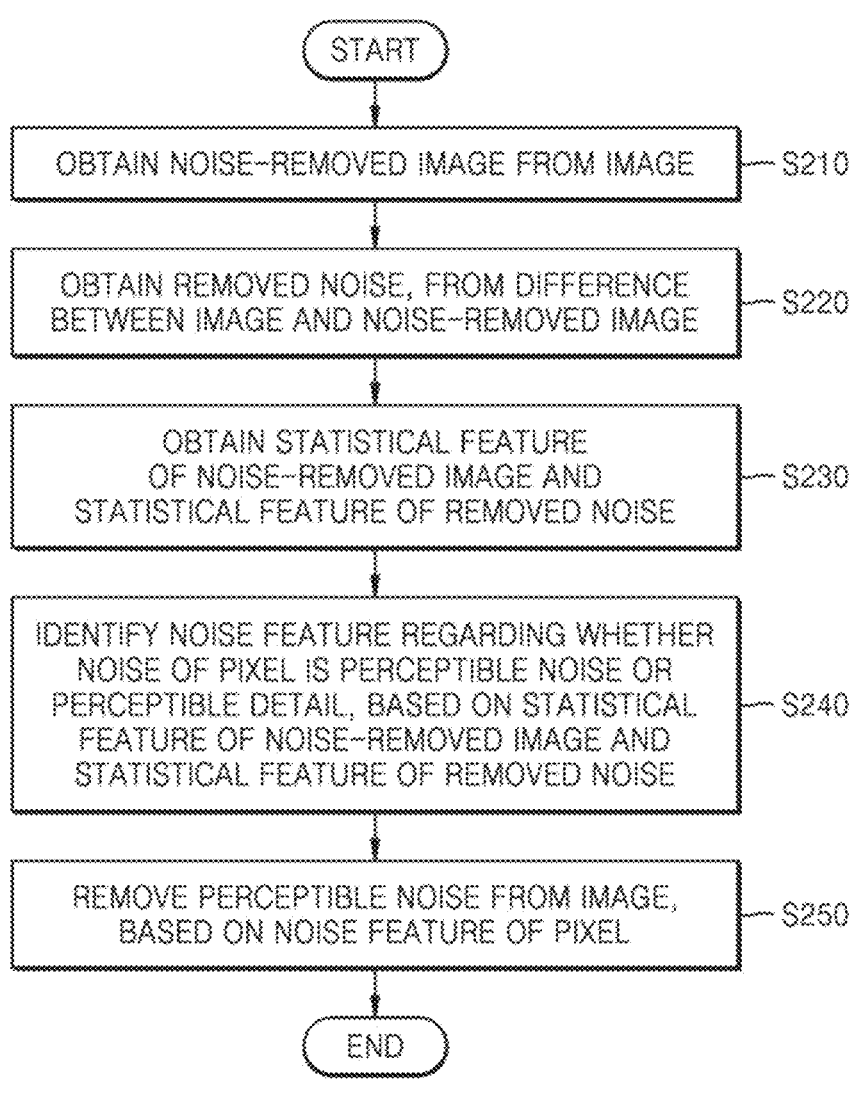
FIG. 2 is a flowchart of an image processing method of removing perceptible noise, according to an embodiment.

FIG. 2 is a flowchart of an image processing method of removing perceptible noise, according to an embodiment. Operations of the image processing method may be performed by the image processing device 1000 illustrated in FIG. 1, the image processing device 1000 illustrated in FIG. 13, the image processing device 1000 illustrated in FIG. 14, or a processor 1300 of the image processing device 1000.

Referring to FIG. 2, in operation S210, the image processing device 1000 may obtain a noise-removed image from an image.

In an embodiment, the image processing device 1000 may obtain the noise-removed image by filtering the image based on a predetermined rule. In another embodiment, the image processing device 1000 may obtain the noise-removed image by applying a predetermined AI model to the image. Examples of methods of removing noise from an image will be described in more detail below with reference to FIGS. 3 and 4. Of course, the method of removing noise from an image is not limited to the above examples, and any previously known method may be used for removing noise from an image.

In operation S220, the image processing device 1000 may obtain removed noise, from a difference between the image and the noise-removed image.

In operation S230, the image processing device 1000 may obtain a statistical feature of the noise-removed image and a statistical feature of the removed noise.

In an embodiment, the image processing device 1000 may obtain a statistical feature of the noise-removed image. For example, an image processing device may calculate a variance of pixels in the noise-removed image. In addition, the image processing device 1000 may obtain a statistical feature of removed noise. For example, an image processing device may calculate a variance of pixels in the removed noise. In an embodiment, the image processing device 1000 may frequency-convert the noise-removed image and the removed noise, and analyze statistical features of results of the frequency-converting.

In an embodiment, the image processing device 1000 may determine a pixel of an image for which a noise feature is to be analyzed, and determine an area including the position of the pixel in the noise-removed image, and an area including the position of the pixel in the removed noise. The image processing device 1000 may obtain a statistical feature of the area in the noise-removed image, and a statistical feature of the area in the removed noise. An example of a method of determining an area and a method of obtaining a statistical feature of an area will be described in more detail below with reference to FIG. 5.

In operation S240, the image processing device 1000 may identify a noise feature of a pixel of an image based on the statistical feature of the noise-removed image and the statistical feature of the noise. Here, the noise feature of the pixel refers to information regarding whether noise of the pixel is perceptible noise or perceptible detail.

In an embodiment, a noise feature of a pixel may indicate whether noise of the pixel is perceptible noise or a perceptible detail. For example, the image processing device 1000 may determine the noise feature of the pixel as a perceptible detail when the difference between the statistical feature of the noise-removed image and the statistical feature of the removed noise is within a predetermined range, and determine the noise feature of the pixel as perceptible noise when the difference between the statistical feature of the noise-removed image and the statistical feature of the removed noise is outside the predetermined range. For example, the noise feature of the pixel may be expressed as 1 when the noise of the pixel corresponds to perceptible noise, and as 0 when the noise of the pixel corresponds to a perceptible detail.

In another embodiment, the noise feature of the pixel may be a feature parameter indicating a degree to which the noise of the pixel corresponds to perceptible noise or a perceptible detail. For example, the image processing device 1000 may calculate a probability or likelihood that the noise of the pixel is perceptible noise, based on the statistical feature of the noise-removed image and the statistical feature of the removed noise. For example, the noise feature of the pixel may be expressed as a value between 0 and 1. The closer the value is to 1, the more the noise of the pixel corresponds to perceptible noise, and the closer the value is to 0, the more the noise of the pixel corresponds to a perceptible detail.

Various examples of methods of determining a noise feature of a pixel will be described in more detail below with reference to FIGS. 6A to 6D.

In operation S250, the image processing device 1000 may remove perceptible noise from the image, based on the noise feature of the pixel.

In an embodiment, when the noise feature of the pixel is determined as a perceptible detail, the image processing device 1000 may maintain the pixel as the pixel of the original image 110 as is. In addition, when the noise feature of the pixel is determined as perceptible noise, the image processing device 1000 may replace the pixel with a corresponding pixel of the noise-removed image 120.

In another embodiment, the image processing device 1000 may remove perceptible noise by combining an original image with the noise-removed image, based on the feature parameter of the pixel. For example, the feature parameter of the pixel may be used as a weight for weighted-averaging the original image and the noise-removed image.

In various embodiments, the image processing device 1000 may perform a process of removing perceptible noise by using an AI model. In various embodiments, the image processing device 1000 may perform a process of removing perceptible noise by using a first AI model for processing perceptible noise and a second AI model for processing a perceptible detail. The first AI model and the second AI model may be trained through a training DB including perceptible-noise images and a training DB including perceptible-detail images, respectively. The training DBs may be constructed by a noise feature determination method according to various embodiments of the present disclosure. The construction of the training DBs and training of the AI models will be described in detail below with reference to FIG. 11.

In various embodiments, the image processing device 1000 may obtain a first modified image by applying, to the original image, the first AI model for processing perceptible noise, and obtain a second modified image by applying, to the original image, the second AI model for processing a perceptible detail. In an embodiment, the image processing device 1000 may replace the value of the pixel with the value of the first modified image when the noise feature of the pixel is determined as perceptible noise, and replace the value of the pixel with the value of the second modified image when the noise feature of the pixel is determined as a perceptible detail.

In another embodiment, the image processing device 1000 may obtain a perceptible-noise-removed image by combining the first modified image with the second modified image based on the feature parameter of the pixel. For example, the feature parameter of the pixel may be used as a weight for weighted-averaging the first modified image and the second modified image.

Various examples of methods of removing perceptible noise from an image will be described in more detail below with reference to FIGS. 7 to 10.

Figure 3:
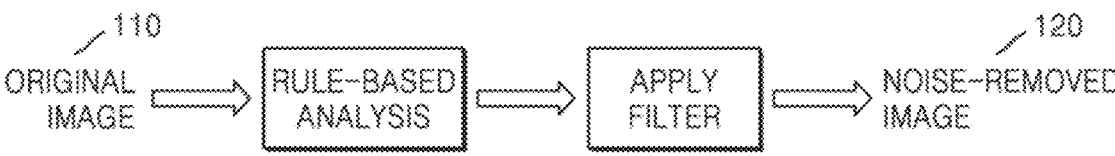
FIG. 3 is a diagram for describing an operation of removing noise based on a rule, according to an embodiment.

FIG. 3 is a diagram for describing an operation of removing noise based on a rule, according to an embodiment. Referring to FIG. 3, the noise-removed image 120 is obtained by removing noise from the original image 110 by applying a filter based on a predetermined rule.

In an embodiment, the image processing device 1000 may determine a high-frequency component of the original image 110 as noise. The image processing device 1000 may obtain the noise-removed image 120 by frequency-converting the original image 110, applying, to an image obtained through the frequency-converting, a filter that removes high-frequency components, and inversely converting the filtered image.

In another embodiment, when the value of a pixel is different from the values of surrounding pixels by a predetermined reference or greater, the image processing device 1000 may determine the pixel as noise. The image processing device may obtain the noise-removed image 120 by applying a filter that changes the value of each pixel of the original image 110 by using the values of surrounding pixels.

According to a method of removing noise based on a predetermined rule, even features recognized as perceptible details by the human visual system may be collectively determined as noise and removed. In this case, the noise-removed image 120 generated based on a rule may include a result of removing a detail. Thus, in order to restore a perceptible detail, detection and removal of perceptible noise according to various embodiments of the present disclosure are subsequently performed.

Figure 4:
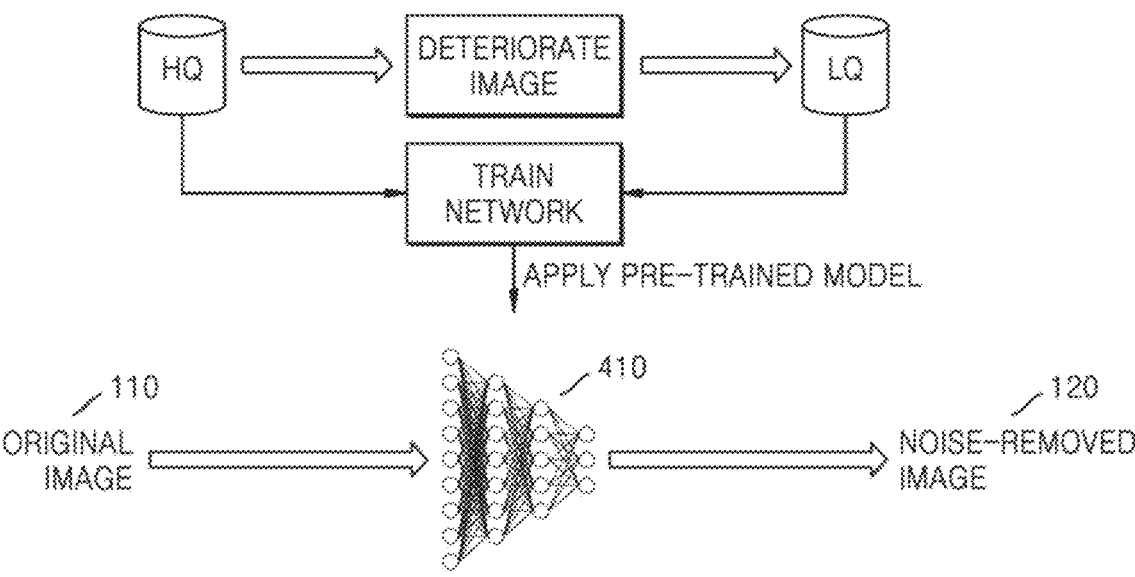
FIG. 4 is a diagram for describing an operation of removing noise by using an artificial intelligence model, according to an embodiment.

FIG. 4 is a diagram for describing an operation of removing noise by using an AI model, according to an embodiment.

Referring to FIG. 4, the noise-removed image 120 is primarily obtained by applying an AI model 410 for removing noise, to the original image 110. In an embodiment, the AI model 410 may be pre-trained by a training DB. In an embodiment, the training DB may include pairs of original high-quality (HQ) images and low-quality (LQ) images that are obtained by deteriorating the original HQ images.

When features included in the training DB that are used for training the AI model 410 are different from the feature of the original image 110, the AI model 410 may make a judgment different from that of the human visual system in distinguishing between noise and details included in the original image 110. For example, the AI model 410 may not determine, as noise, a part of the original image 110 that is determined as perceptible noise by the human visual system, or may not determine, as a detail, a part of original image 110 that is determined as a perceptible detail by the human visual system. In this case, the noise-removed image 120 generated by the AI model 410 may include a result of increasing noise of the original image 110 or removing a detail from the original image 110. Thus, in order to remove perceptible noise and restore a perceptible detail, detection and removal of perceptible noise according to various embodiments of the present disclosure are subsequently performed.

Figure 5:
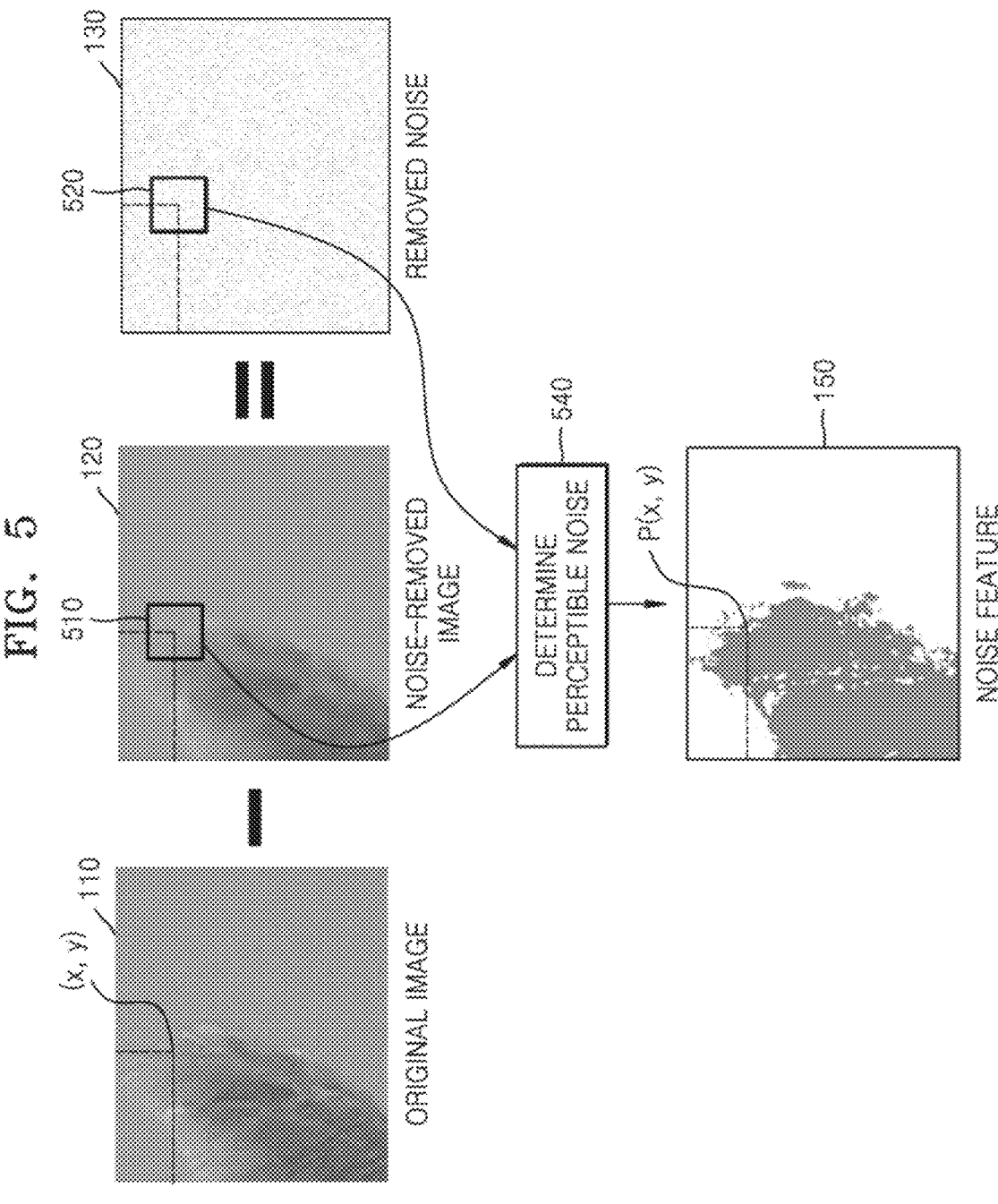
FIG. 5 is a diagram for describing an operation of determining a noise feature, according to an embodiment.

FIG. 5 is a diagram for describing an operation of determining a noise feature, according to an embodiment.

Referring to FIG. 5, in an embodiment, the image processing device 1000 may determine a pixel of the original image 110 for which a noise feature is to be analyzed. The image processing device 1000 may repeatedly perform the operation of analyzing a noise feature on the respective pixels of the original image 110, according to various embodiments of the present disclosure.

In an embodiment, the image processing device 1000 may obtain the noise-removed image 120 from the original image 110. In addition, the image processing device 1000 may obtain the removed noise 130, from a difference between the original image 110 and the noise-removed image 120.

In an embodiment, in order to determine statistical features of the noise-removed image 120 and the removed noise 130, the image processing device 1000 may determine areas corresponding to the positions of the pixel in the noise-removed image 120 and the removed noise 130, respectively. In an embodiment, the image processing device 1000 may determine a first area 510 in the noise-removed image 120, which corresponds to a pixel (x, y) of the original image 110. The first area 510 may be an area for determining a statistical feature of the noise-removed image. In addition, in an embodiment, the image processing device 1000 may determine a second area 520 in the removed noise 130, which corresponds to the position (x, y) of the pixel of the original image 110. The second area 520 may be an area for determining a statistical feature of the removed noise. The positions and sizes of the first area 510 and the second area 520 may be set to be equal to each other.

As the size of the area increases, the statistical feature of the area corresponding to the pixel is analyzed similarly to a statistical feature of an area corresponding to an adjacent pixel, and thus, a noise feature may be determined without sudden changes between adjacent pixels. On the contrary, as the size of the area decreases, a noise feature of each pixel may be determined more precisely. Thus, for an image with noise distributed across the image, it may be preferable to determine a wide area for determining a noise size of a pixel, and for an image with partially distributed noise, it may be preferable to determine a narrow area for determining a noise level of a pixel.

In an embodiment, the shapes and sizes of the first area 510 and the second area 520 may be predetermined. For example, each of the first area 510 and the second area 520 may be an area with a size of N×N pixels (N is a natural number) centered on the position of a pixel for which a noise feature is to be analyzed.

In another embodiment, the shapes and sizes of the first area 510 and the second area 520 may be adaptively determined according to features of the image or a feature of an area surrounding the pixel. For example, the image processing device 1000 may determine the shapes and sizes of the areas based on attributes of the image, such as size, color information, motion information, class, tag, encoding method, or storage method. As another example, the image processing device 1000 may determine the shape and size of the area by analyzing statistical features of the image or the pixel, such as average, variance, or amount of change.

In another embodiment, the shapes and sizes of the first area 510 and the second area 520 may be set by a user of the image processing device 1000. For example, the image processing device 1000 may receive, from the user, an input for directly setting the size and shape of the area. As another example, the image processing device 1000 may receive a user input for setting sensitivity, precision, or intensity of detecting and removing perceptible noise, and determine the size and shape of the area based on the user input.

In an embodiment, the image processing device 1000 may obtain statistical features of pixel values included in the first area 510, as statistical features of the noise-removed image 120, and obtain a statistical feature included in the second area 520 as a statistical feature of the removed noise 130.

In an embodiment, the image processing device 1000 may determine (540) the noise feature 150 regarding whether noise of the pixel is perceptible noise or a perceptible detail by analyzing the statistical features of the pixel values included in the first area 510 and the second area 520.

In an embodiment, the noise feature of the pixel may be expressed as a certain value. For example, the noise feature of the pixel may be expressed as 1 when the noise of the pixel corresponds to perceptible noise, and as 0 when the noise of the pixel corresponds to a perceptible detail. As another example, the noise feature of the pixel is expressed as a value between 0 and 1, and the closer the value is to 1, the noise of the pixel may correspond to perceptible noise, and the closer the value is to 0, and the closer the value is to 0, the noise of the pixel may correspond a perceptible detail.

In an embodiment, the image processing device 1000 may obtain a value P(x, y) representing a noise feature of each pixel (x, y) of the original image 110. As a result, the noise feature 150 of the removed noise 130 may be expressed as a noise feature map representing P(x, y) for each pixel (x, y).

In an embodiment, the image processing device 1000 may obtain a perceptible-noise-removed image based on a map representing the noise feature 150, the original image 110, and the noise-removed image 120. In an embodiment, the image processing device 1000 may combine the original image 110 with the noise-removed image 120 by using the map representing the noise feature 150 as a weight.

FIGS. 6A to 6D are diagrams for describing various embodiments of an operation of determining a noise feature.

Figure 6A:
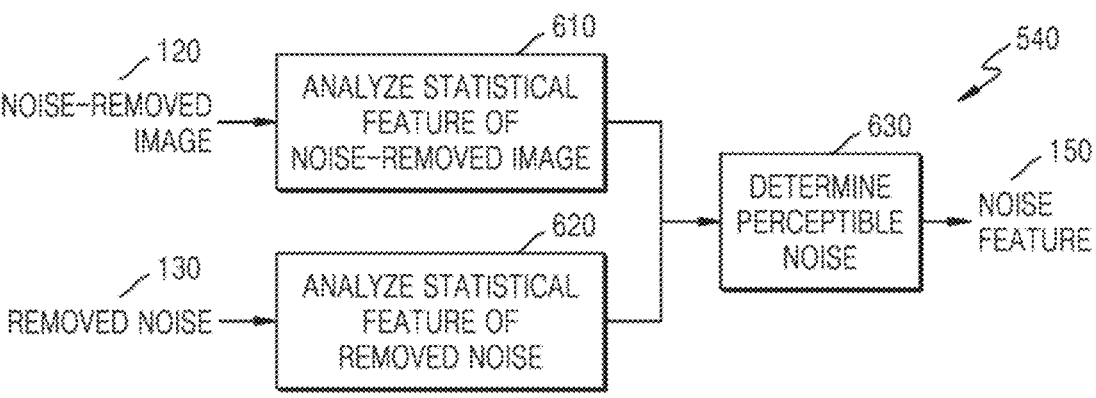
FIGS. 6A, 6B, 6C and 6D are diagrams for describing various embodiments of an operation of determining a noise feature.

FIG. 6A illustrates an embodiment of determining the noise feature 150 based on a statistical feature of the noise-removed image 120 and a statistical feature of the removed noise 130. Operations illustrated in FIG. 6A may correspond to the operation of determining perceptible noise (540) illustrated in FIG. 5.

In operation 610, the image processing device 1000 may analyze a statistical feature of the noise-removed image 120. In an embodiment, the statistical feature of the noise-removed image 120 may be the statistical feature of the first area 510 illustrated in FIG. 5. In operation 620, the image processing device 1000 may analyze a statistical feature of the removed noise 130. In an embodiment, the statistical feature of the removed noise 130 may be the statistical feature of the second area 520 illustrated in FIG. 5.

For example, the image processing device 1000 may obtain a variance of the noise-removed image 120 and a variance of the removed noise 130. In operation 630, the image processing device 1000 may determine the noise feature 150 based on the statistical features of the noise-removed image 120 and the removed noise 130.

In an embodiment, the image processing device 1000 may calculate a noise visibility function (NVF) indicating the visibility of noise for the pixel, based on the statistical feature of the noise-removed image and the statistical feature of the removed noise.

In an embodiment, the NVF may be calculated by Equation 1 below. The calculated NVF has a value between 0 and 1, and the closer the NVF is to 1, the more visible the noise is, and the closer the NVF is to 0, the less visible the noise is.

$$NVF = \frac{W_N \sigma_N}{W_N \sigma_N + \sigma_S} \qquad \text{[Equation 1]}$$

Here, as denotes the variance of the noise-removed image 120, GN denotes the variance of the removed noise 130, and WN denotes a preset constant. WN is a constant for adjusting the sensitivity or intensity of determining perceptible noise, and may be set to be a larger value for increasing a reference for determining perceptible noise.

However, the NVF calculated by Equation 1 above may be difficult to be used for determining perceptible noise because the value is not uniform. Thus, in order to apply the NVF to analysis of perceptible noise, Equation 1 may be modified as follows.

$$NVF = \frac{W_N \sigma_N + C}{W_N \sigma_N + \sigma_S + C} \qquad \text{[Equation 2]}$$

C denotes a preset constant for uniformizing a non-uniform result of the NVF. In an embodiment, C may be determined according to the data type or number of bits of an image.

The image processing device 1000 may identify a noise feature of the pixel based on the calculated NVF value. In an embodiment, the image processing device 1000 may determine the noise feature of the pixel as perceptible noise when the NVF of the pixel is close to 1, and as a perceptible detail when the NVF of the pixel is close to 0. For example, the image processing device 1000 may determine the noise feature of the pixel as perceptible noise when the NVF value of the pixel is greater than or equal to a predetermined threshold, and as a perceptible detail when the NVF value of the pixel is less than the predetermined threshold. The predetermined threshold may be set to, for example, 0.1. Of course, the present disclosure is not limited to the above example. In an embodiment, the predetermined threshold may be set according to the sensitivity or intensity of determining perceptible noise.

In another embodiment, the image processing device 1000 may determine a feature parameter indicating a degree to which the noise of the pixel corresponds to perceptible noise or a perceptible detail, based on the NVF value of the pixel. For example, the image processing device 1000 may determine the NVF value of the pixel as a feature parameter indicating a degree to which the noise of the pixel corresponds to a perceptible detail. On the contrary, the image processing device 1000 may determine a value obtained by subtracting the NVF value of the pixel from 1, as a feature parameter indicating a degree to which the noise of the pixel corresponds to perceptible noise.

Figure 6B:
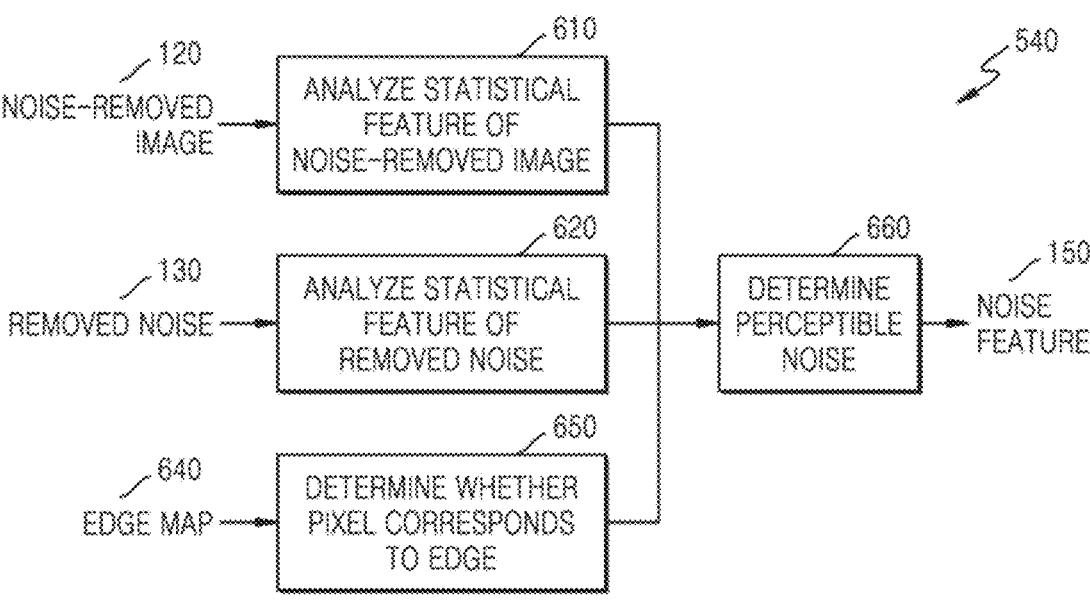

Compared to FIG. 6A, FIG. 6B illustrates an embodiment of determining the noise feature 150 based on an edge map. Operations illustrated in FIG. 6B may correspond to the operation of determining perceptible noise (540) illustrated in FIG. 5. Operations 610 and 620 of FIG. 6B may correspond to operations 610 and 620 of FIG. 6A, and thus, redundant descriptions will be omitted.

According to an embodiment, in operation 650, the image processing device 1000 may determine whether a pixel corresponds to an edge, based on an edge map 640 of the image. The edge map 640 indicates whether each pixel of the image corresponds to a boundary of an object expressed in the image. The edge map 640 may be generated by the image processing device 1000 using any known method. Alternatively, the edge map 640 may be obtained together with the image from a separate source.

In operation 660, the image processing device 1000 may identify a noise feature of the pixel further based on whether the pixel corresponds to an edge, in addition to the statistical feature of the noise-removed image 120 and the statistical feature of the removed noise 130. When an image is divided into flat, edge, and detail areas, noise may be relatively easily recognized in the flat area and the edge area. On the contrary, noise may be relatively less visible in the detail area. Thus, in an embodiment, when the pixel corresponds to an edge, the image processing device 1000 may determine the noise feature of the pixel as a perceptible detail.

In an embodiment, an NVF may be calculated according to Equation 3 below, reflecting the determination of whether the pixel corresponds to an edge.

15

$$NVF = \max\left(\frac{W_N\sigma_N + C}{W_N\sigma_N + \sigma_S + C}, \text{is\_edge}\right) \qquad \text{[Equation 3]}$$

Here, is_edge has a value of 1 when the pixel corresponds to an edge, and 0 otherwise.

According to Equation 1 or Equation 2, although noise is perceptually well recognized in the edge area, the NVF has a value close to 0, and thus, the noise feature of the pixel may be classified as a perceptible detail. On the contrary, according to Equation 3, the NVF of a pixel corresponding to an edge always has a value of 1, and thus, the noise feature of the pixel is classified as perceptible noise.

Figure 6C:
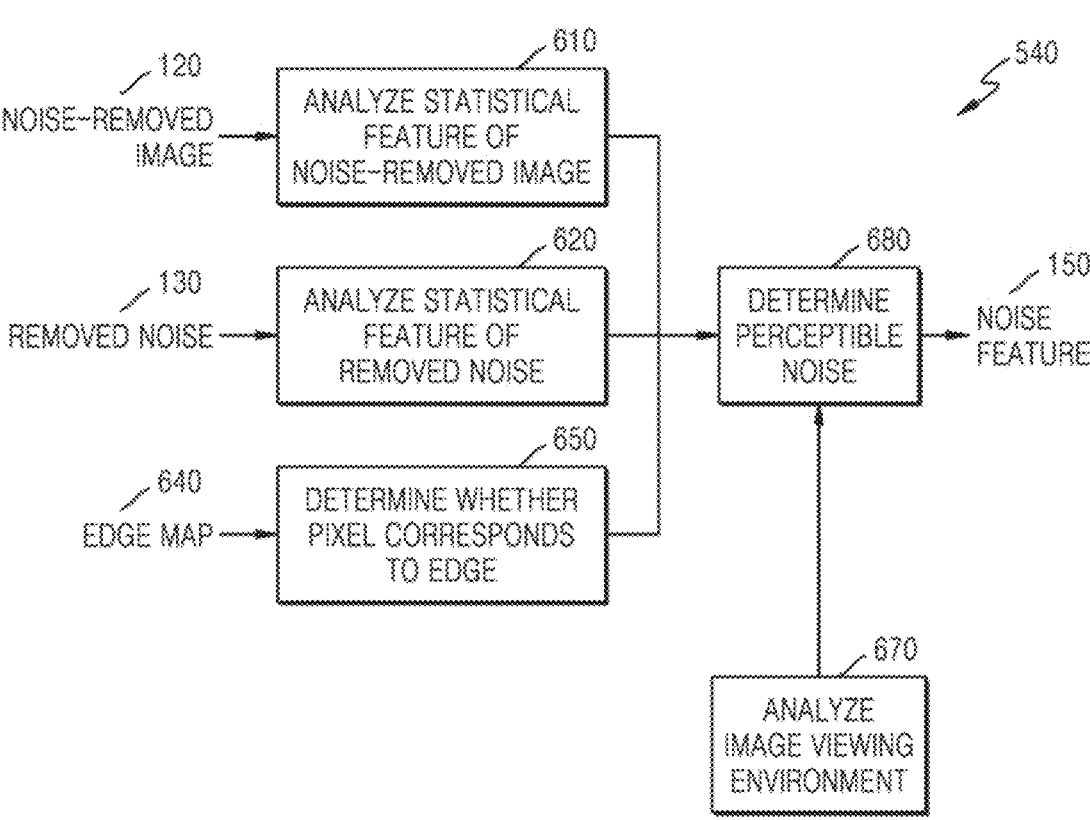

Compared to FIG. 6B, FIG. 6C illustrates an embodiment of determining the noise feature 150 further based on an image viewing environment. Operations illustrated in FIG. 6C may correspond to the operation of determining perceptible noise (540) illustrated in FIG. 5. Operations 610, 620, and 650 of FIG. 6C may correspond to operations 610, 620, and 650 of FIG. 6B, and thus, redundant descriptions will be omitted.

According to an embodiment, in operation 670, the image processing device 1000 may analyze an image viewing environment. For example, the image processing device 1000 may analyze an image viewing environment such as the size of a screen on which the image is reproduced, the brightness of the screen, or the viewing distance of the image.

In an embodiment, the image viewing environment may be obtained from an image reproduction device. For example, the image processing device 1000 may obtain, from the image reproduction device, information about the size and brightness of a screen on which the image is reproduced. For example, the image processing device 1000 may obtain, from the image reproduction device, information about an appropriate viewing distance, or may obtain information about a viewing distance measured by a sensor of the image reproduction device.

In another embodiment, the image viewing environment may be set by the user of the image processing device 1000. For example, in order to remove perceptible noise from an image, the user of the image processing device 1000 may assume that the image is reproduced with a particular screen size, a particular screen brightness, and/or a particular viewing distance.

In an embodiment, the image viewing environment may be analyzed in real time during reproduction of the image. For example, when the size or brightness of the image is adjusted or the image viewing distance is changed during reproduction of the image, the image processing device 1000 may obtain information about the changed image viewing environment from the image reproduction device in real time.

In operation 680, the image processing device 1000 may identify a noise feature of the pixel based on a result of analyzing image viewing environment. As the size of the screen on which the image is reproduced increases, the visibility of noise may increase. When the brightness of the screen on which the image is reproduced increases, the image is corrected to prevent brightness saturation, thus the difference between pixels decreases, and thus, the visibility of noise may decrease. As the viewing distance of the image increases, the visibility of noise may decrease. Thus, the image processing device 1000 may determine that the noise feature corresponds to perceptible noise, as the size of the screen on which the image is reproduced, as the brightness of the screen decreases, and as the viewing distance of the image decreases.

In an embodiment, the NVF may be calculated by Equation 4 below, reflecting the image viewing environment.

$$NVF =$$

$$\max\left(\frac{W_N\sigma_N + C}{W_N\sigma_N + \sigma_S + C} \times \frac{\text{size}}{\text{brightness} \times \text{distance}}, \text{is\_edge}\right) \qquad \text{[Equation 4]}$$

Here, size denotes the size of the screen on which the image is reproduced, brightness denotes the brightness of the screen, and distance denotes the viewing distance of the image.

According to Equation 4, as the size of the screen on which the image is reproduced, as the brightness of the screen decreases, and as the viewing distance of the image decreases, the NVF has a value close to 1, and thus, the noise feature of the pixel more tends to be determined as perceptible noise.

Figure 6D:
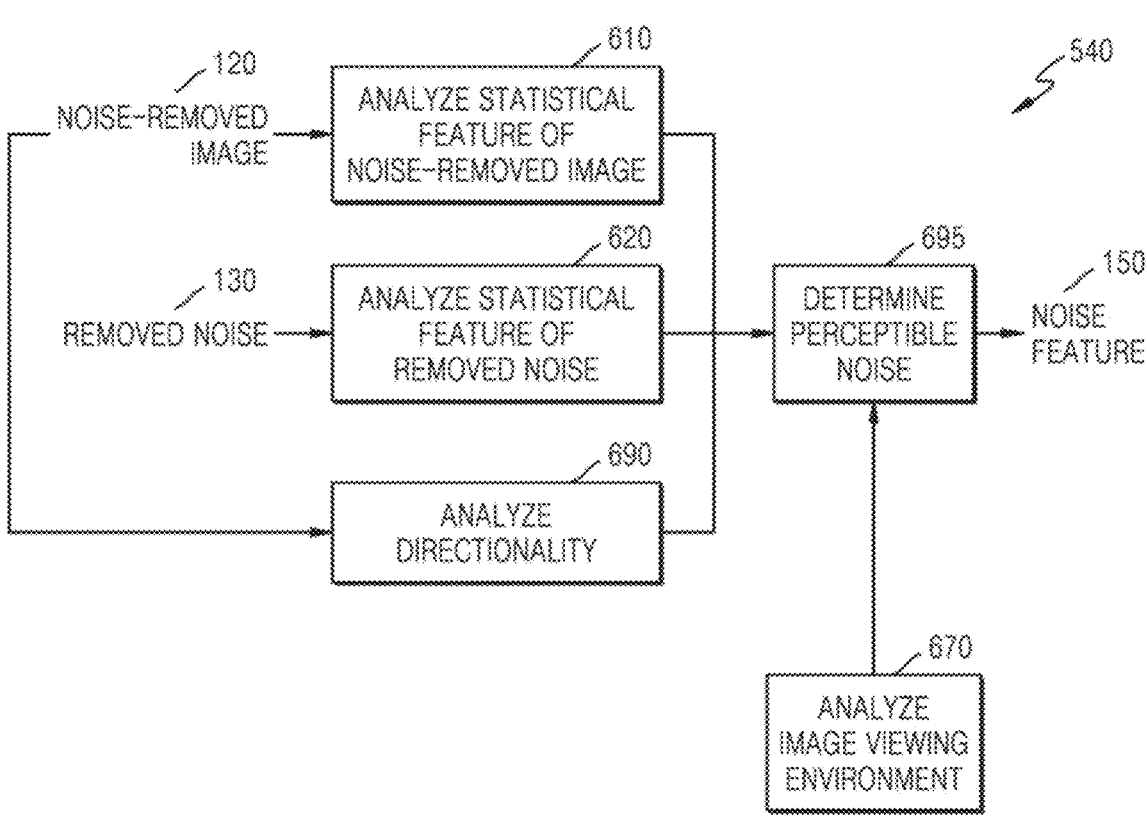

Compared to FIG. 6C, FIG. 6D illustrates an embodiment of determining the noise feature 150 based on directionality instead of an edge map. Operations illustrated in FIG. 6D may correspond to the operation of determining perceptible noise (540) illustrated in FIG. 5. Operations 610, 620, and 670 of FIG. 6D may correspond to operations 610, 620, and 670 of FIG. 6C, and thus, redundant descriptions will be omitted.

According to an embodiment, in operation 690, the image processing device 1000 may analyze the directionality of a pixel, from the noise-removed image 120. The directionality of the pixel refers to a degree to which the values of the pixel and an area surrounding the pixel are in a particular direction.

In an embodiment, the image processing device 1000 may calculate the directionality of the pixel based on a gradient of the pixel. In an embodiment, the image processing device 1000 may identify the directionality of each of the pixel and surrounding pixels, and calculate the directionality of the pixel based on the distribution of directionality. For example, the pixel may be determined as a texture when the distribution of directionality is uniform, and as an edge with directionality when the distribution is concentrated in a certain range. The method of identifying the directionality of a pixel is not limited to the above example, and the image processing device 1000 may obtain the directionality of a pixel by using any other known method.

In operation 695, the image processing device 1000 may identify a noise feature of the pixel further based on the directionality of the pixel in addition to the statistical feature of the noise-removed image 120 and the statistical feature of the removed noise 130. Noise does not have particular directionality, but an edge is in a particular direction, and thus, the visibility of noise may increase in an area with directionality. Accordingly, as the directionality of the pixel increases, the image processing device 1000 may determine that the noise feature corresponds to perceptible noise.

In an embodiment, the NVF may be calculated by Equation 5 below, reflecting the directionality of the pixel.

$$NVF = \frac{W_N\sigma_N + C}{W_N\sigma_N + \sigma_S + C} \times \frac{\text{size} \times \text{directionality}}{\text{brightness} \times \text{distance}} \qquad \text{[Equation 5]}$$

Here, directionality denotes the directionality of the pixel.

According to Equation 2 using an edge map, a pixel, which is determined to correspond to an edge, is unconditionally classified as perceptible noise, and thus, when an incorrect edge map is obtained, perceptible noise may also be misclassified. On the contrary, because the directionality of a pixel may indicate a degree to which the pixel corresponds to an edge, according to Equation 5, a pixel in an area with high directionality may be determined as perceptible noise.

Figure 7:
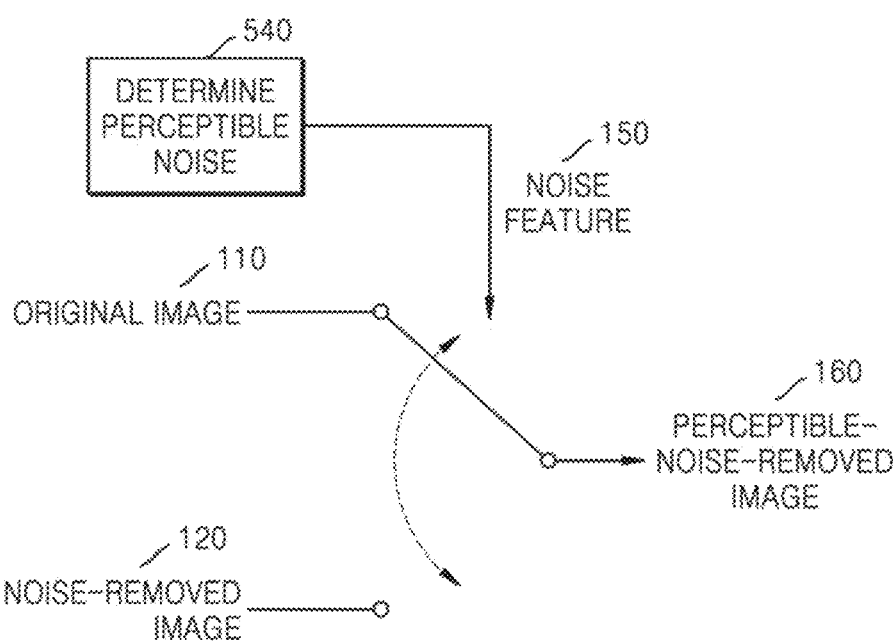
FIG. 7 is a diagram illustrating an operation of removing perceptible noise based on a noise feature, according to an embodiment.

FIG. 7 is a diagram illustrating an operation of removing perceptible noise based on a noise feature, according to an embodiment.

FIG. 7 illustrates an embodiment of obtaining a perceptible-noise-removed image by selecting any one of the original image 110 and the noise-removed image 120 according to the noise feature 150. According to a method of determining perceptible noise (540) according to various embodiments of the present disclosure, the noise feature 150 indicating whether noise of a corresponding pixel is perceptible noise or a perceptible detail may be obtained. For example, the image processing device may calculate an NVF of a pixel, and identify a noise feature of the pixel as perceptible noise when the calculated NVF value is greater than or equal to a predetermined threshold, and as a perceptible detail when the calculated NVF value is less than the predetermined threshold. For example, the noise feature of the pixel may be expressed as 1 when the noise of the pixel corresponds to perceptible noise, and as 0 when the noise of the pixel corresponds to a perceptible detail.

In an embodiment, when the noise feature of the pixel is determined as a perceptible detail, the image processing device 1000 may maintain the pixel as the pixel of the original image 110 as is. In addition, when the noise feature of the pixel is determined as perceptible noise, the image processing device 1000 may replace the pixel with a corresponding pixel of the noise-removed image 120. The image processing device 1000 may determine the noise feature 150 for each pixel of the image, and obtain the perceptible-noise-removed image 160 by performing a process of replacing only a pixel determined as perceptible noise with a pixel of the noise-removed image 120.

Figure 8:
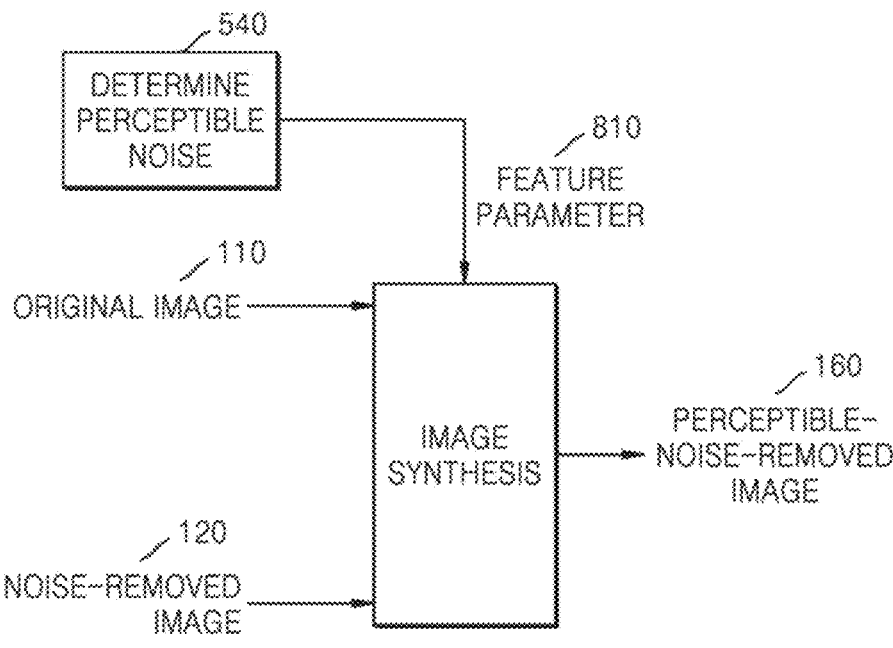
FIG. 8 is a diagram illustrating an operation of removing perceptible noise through image synthesis, according to an embodiment.

FIG. 8 is a diagram illustrating an operation of removing perceptible noise through image synthesis, according to an embodiment.

FIG. 8 illustrates an embodiment of obtaining a perceptible-noise-removed image by combining the original image 110 with the noise-removed image 120 according to a feature parameter 810. According to the method of determining perceptible noise (540) according to various embodiments of the present disclosure, a feature parameter indicating a degree to which noise of a pixel corresponds to perceptible noise or a perceptible detail may be determined. For example, the image processing device 1000 may determine an NVF value of the pixel as a feature parameter indicating a degree to which noise of the pixel corresponds to a perceptible detail. For example, the feature parameter of the pixel may be expressed as a value between 0 and 1. The closer the feature parameter is to 1, the noise of the pixel may correspond to perceptible noise, and the closer the feature parameter is to 0, the noise of the pixel may correspond to a perceptible detail.

In an embodiment, the image processing device 1000 may remove perceptible noise by combining the original image 110 with the noise-removed image 120, based on the feature parameter of the pixel. For example, the feature parameter 810 of the pixel may be used as a weight for weighted-averaging the original image 110 and the noise-removed image 120. The image processing device 1000 may obtain the feature parameter 810 for each pixel of the image, and obtain the perceptible-noise-removed image 160 by performing a process of mixing pixels of the original image 110 with pixels of the noise-removed image 120 according to the proportion of the feature parameter 810.

In an embodiment, each pixel value of the perceptible-noise-removed image 160 may be obtained by the following equation.

$$V_p(x, y) = P(x, y)V_S(x, y) + (1 - P(x, y))V_O(x, y) \qquad \text{[Equation 6]}$$

$V_o(x, y)$ denotes a pixel value at coordinates (x, y) of the original image 110, $V_s(x, y)$ denotes a pixel value at coordinates (x, y) of the noise-removed image 120, and $V_p(x, y)$ denotes a pixel value at coordinates (x, y) of the perceptible-noise-removed image 160. P(x, y) has a value between 0 and 1 for (x, y), and is the feature parameter 810 indicating that the closer the value is to 1, the noise of the pixel corresponds to perceptible noise, and the closer the value is to 0, the noise of the pixel corresponds to a perceptible detail.

Figure 9:
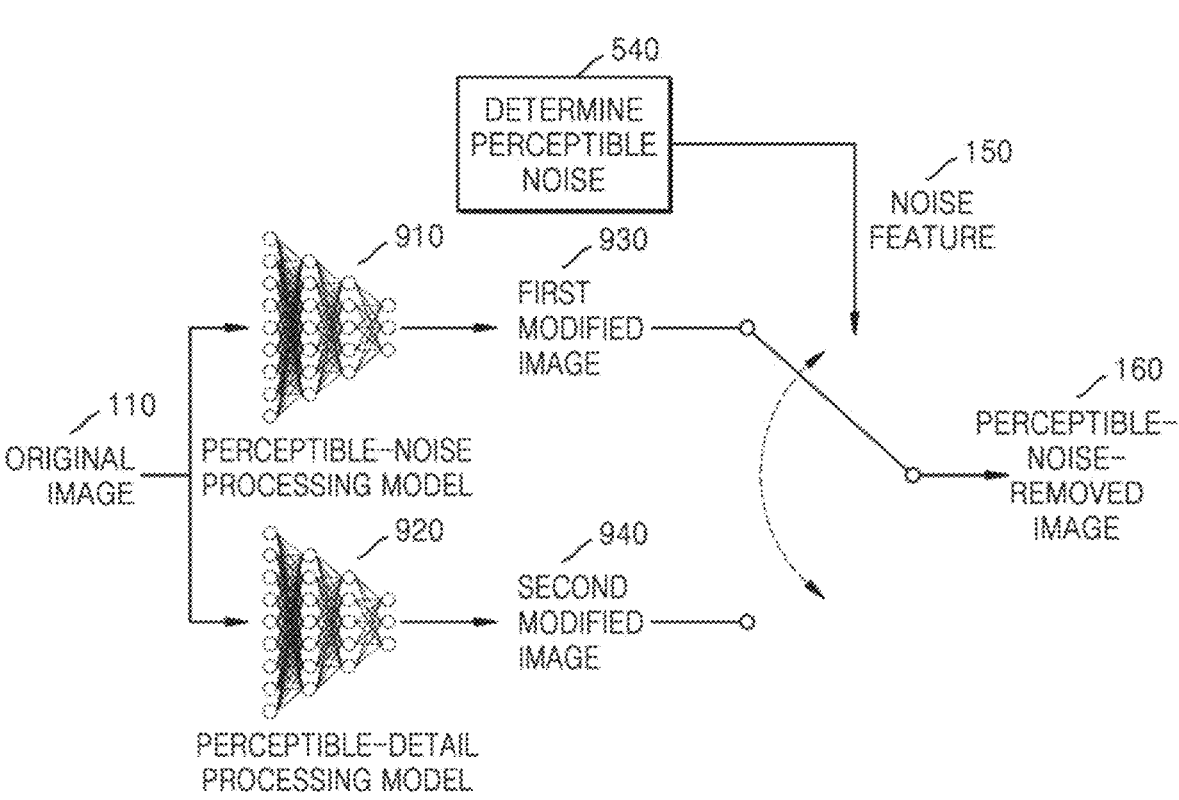
FIG. 9 is a diagram illustrating an operation of removing perceptible noise by using artificial intelligence models, according to an embodiment.

FIG. 9 is a diagram illustrating an operation of removing perceptible noise by using AI models, according to an embodiment.

FIG. 9 illustrating an embodiment of performing a process of removing perceptible noise by using a perceptible-noise processing model 910 for processing perceptible noise and a perceptible-detail processing model 920 for processing a perceptible detail. The perceptible-noise processing model 910 may be an AI model trained through a training DB containing perceptible-noise images. The perceptible-detail processing model 920 may be an AI model trained through a training DB containing perceptible-detail images. The training DBs may be constructed by the method of determining a noise feature according to various embodiments of the present disclosure.

In various embodiments, the image processing device 1000 may obtain a first modified image 930 by applying, to the original image 110, the perceptible-noise processing model 910, and obtain a second modified image 940 by applying, to the original image 110, the perceptible-detail processing model 920.

According to a method of determining perceptible noise (540) according to various embodiments of the present disclosure, the noise feature 150 indicating whether noise of a corresponding pixel is perceptible noise or a perceptible detail may be obtained. In an embodiment, the image processing device 1000 may replace the value of a pixel with a value of the first modified image 930 when the noise feature 150 of the pixel is determined as perceptible noise, and replace the value of a pixel with a value of the second modified image 940 when the noise feature 150 of the pixel is determined as a perceptible detail. The image processing device 1000 may determine the noise feature 150 for each pixel of an image, and obtain the perceptible-noise-removed image 160 by performing a process of replacing the pixel with a pixel of the first modified image 930 or the second modified image 940 according to the noise feature.

Figure 10:
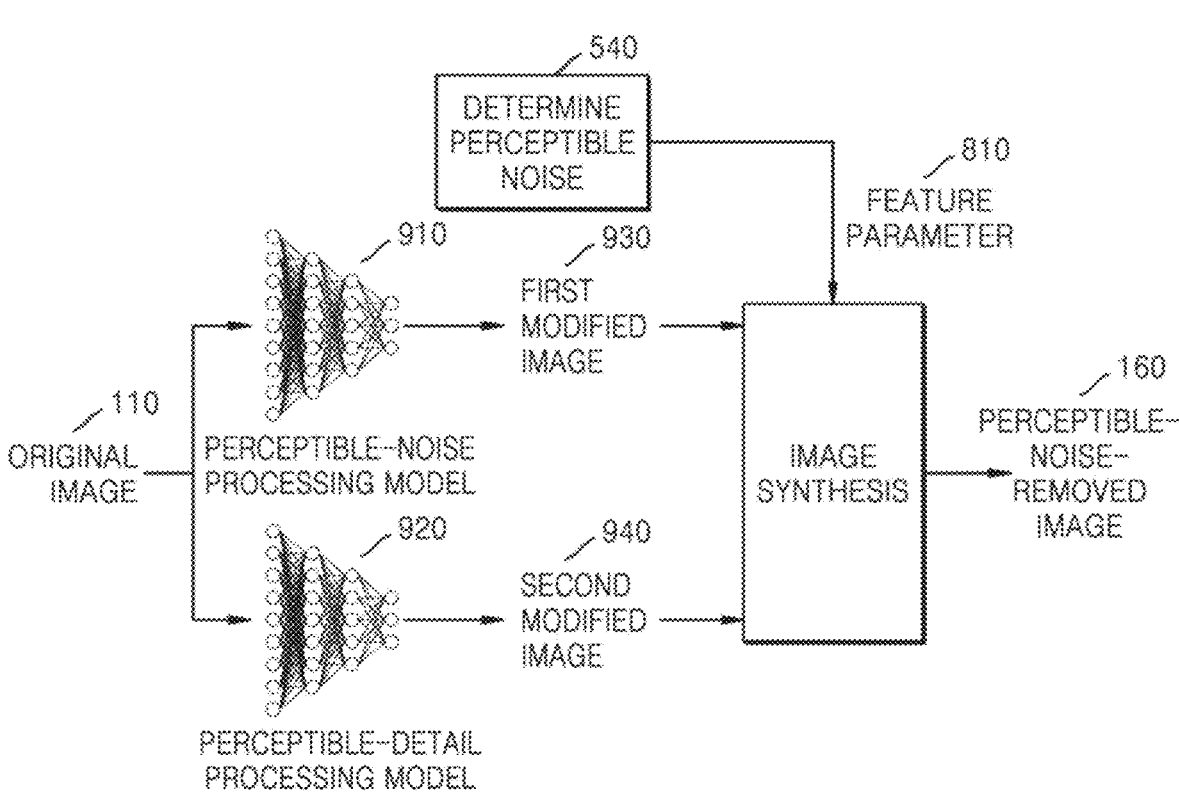
FIG. 10 is a diagram illustrating an operation of removing perceptible noise by using artificial intelligence models, according to another embodiment.

FIG. 10 is a diagram illustrating an operation of removing perceptible noise by using AI models, according to another embodiment.

FIG. 10 illustrating an embodiment of performing a process of removing perceptible noise by using the perceptible-noise processing model 910 for processing perceptible noise and the perceptible-detail processing model 920 for processing a perceptible detail. Similar to the embodiment illustrated in FIG. 9, the image processing device 1000 may obtain the first modified image 930 by applying, to the original image 110, the perceptible-noise processing model 910, and obtain the second modified image 940 by applying, to the original image 110, the perceptible-detail processing model 920.

According to the method of determining perceptible noise (540) according to various embodiments of the present disclosure, a feature parameter indicating a degree to which noise of a pixel corresponds to perceptible noise or a perceptible detail may be determined. In an embodiment, the image processing device 1000 may remove perceptible noise by combining the first modified image 930 with the second modified image 940 based on the pixel feature parameter 810. For example, the feature parameter 810 of the pixel may be used as a weight for weighted-averaging the first modified image 930 and the second modified image 940. The image processing device 1000 may obtain the feature parameter 810 for each pixel of the image, and obtain the perceptible-noise-removed image 160 by performing a process of mixing pixels of the first modified image 930 with pixels of the second modified image 940 according to the proportion of the feature parameter 810.

In an embodiment, each pixel value of the perceptible-noise-removed image 160 may be obtained by the following equation.

$$V_p(x, y) = P(x, y)V_1(x, y) + (1 - P(x, y))V_2(x, y) \qquad \text{[Equation 7]}$$

$V_1(x, y)$ denotes a pixel value at coordinates (x, y) of the first modified image 930 obtained by the perceptible-noise processing model 910. $V_2(x, y)$ denotes a pixel value at coordinates (x, y) of the second modified image 940 obtained by the perceptible-detail processing model 920. $V_p(x, y)$ denotes to a pixel value at coordinates (x, y) of the perceptible-noise-removed image 160. $P(x, y)$ has a value between 0 and 1 for (x, y), and is the feature parameter 810 indicating that the closer the value is to 1, the noise of the pixel corresponds to perceptible noise, and the closer the value is to 0, the noise of the pixel corresponds to a perceptible detail.

Figure 11:
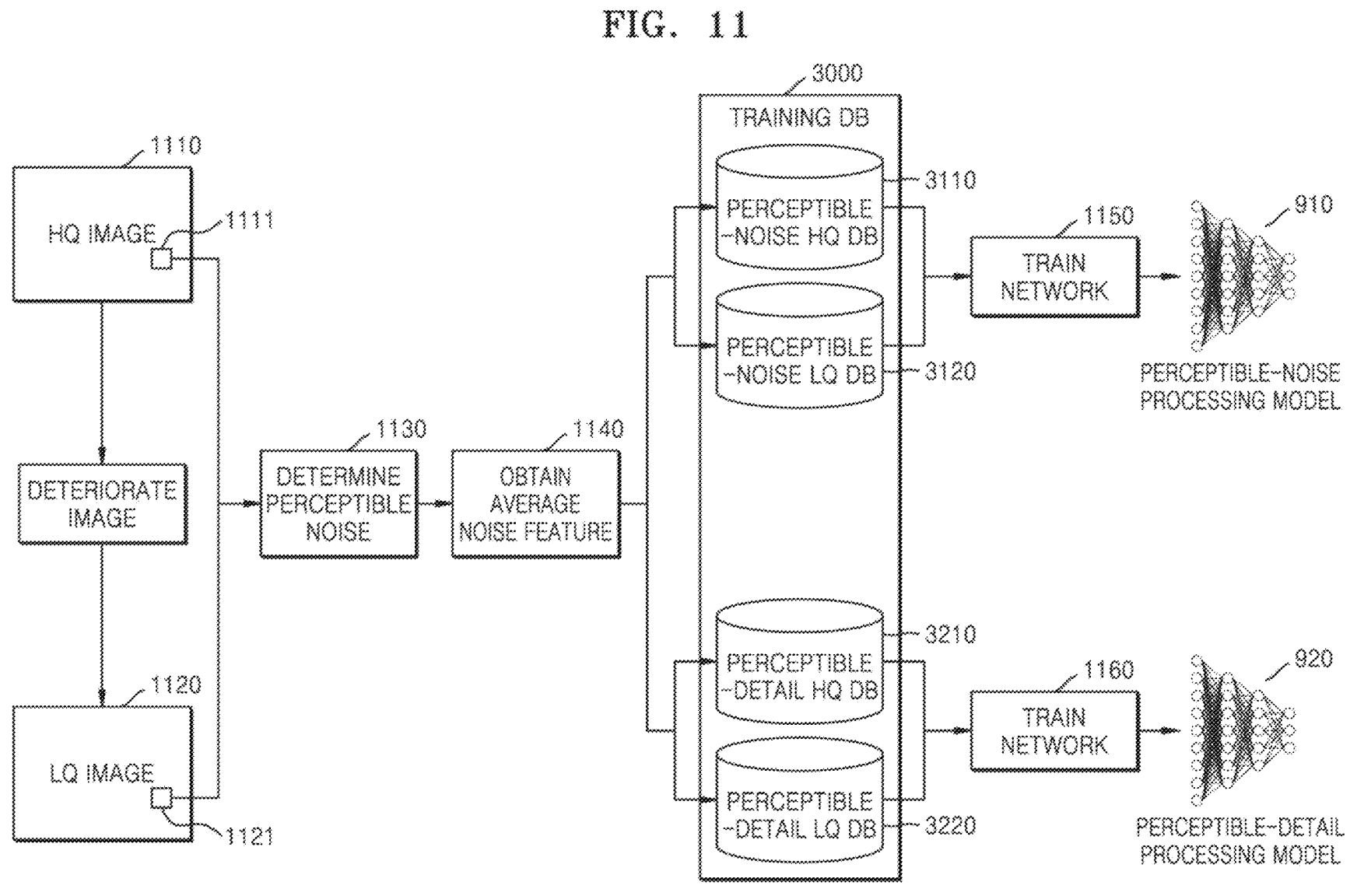

FIG. 11 is a diagram illustrating an operation, performed by an AI model training device, of training AI models for processing perceptible noise and a perceptible detail of an image, according to an embodiment.

Referring to FIG. 11, an AI model training device 2000 may deteriorate an arbitrary HQ image 1110 to generate an LQ image 1120. In an embodiment, the AI model training device 2000 may divide each of the HQ image 1110 and the LQ image 1120 into patches having a predetermined size. This is for organizing a training DB with images of the same size so as to facilitate training of an AI model and obtain consistent training results.

In operation 1130, based on a patch 1111 of the HQ image and a patch 1121 of the LQ image corresponding to the patch 1111 of the HQ image, the AI model training device 2000 may identify noise features of the patches. Here, in order to determine the noise features of the patches, the method of determining perceptible noise according to various embodiments of the present disclosure may be used. For example, the AI model training device 2000 may use the method of determining perceptible noise according to various embodiments of the present disclosure by using the patch 1121 of the LQ image as an original image, and the patch 1111 of the HQ image corresponding thereto as a noise-removed image.

In various embodiments, the AI model training device 2000 may obtain removed noise, from a difference between the patch 1111 of the HQ image and the patch 1121 of the LQ image. In various embodiments, the AI model training device 2000 may obtain a statistical feature of the patch 1111 of the HQ image and a statistical feature of the removed noise. In various embodiments, the AI model training device 2000 may identify a noise feature indicating whether the removed noise is perceptible noise or a perceptible detail, based on the obtained statistical features. In an embodiment, the AI model training device 2000 may calculate an NVF according to various embodiments of the present disclosure, and identify a noise feature of a pixel based on the calculated NVF value.

In operation 1140, the AI model training device 2000 may obtain an average noise feature of the patch 1121 of the LQ image. In an embodiment, the AI model training device 2000 may obtain the average noise feature of the patch 1121 of the LQ image by averaging NVF values calculated for respective pixels of the patch 1121 of the LQ image. For example, the AI model training device 2000 may determine the average noise feature of the patch 1121 as perceptible noise when an average NVF value of the patch 1121 of the LQ image is greater than or equal to a predetermined threshold, and as a perceptible detail when the average NVF value is less than the threshold. The predetermined threshold may be set to, for example, 0.1. Of course, the present disclosure is not limited to the above example. In an embodiment, the predetermined threshold may be set according to the sensitivity or intensity of determining perceptible noise.

The AI model training device 2000 may classify the patch 1111 of the HQ image and the patch 1121 of the LQ image into a perceptible-noise DB or a perceptible-detail DB according to the obtained average noise feature, and store them in a training DB 3000. The training DB 3000 may include a perceptible-noise HQ DB 3110, a perceptible-noise LQ DB 3120 corresponding thereto, a perceptible-detail HQ DB 3210, and a perceptible-detail LQ DB 3220 corresponding thereto. When the average noise feature is determined as perceptible noise, the AI model training device 2000 may store the patch 1111 of the HQ image in the perceptible-noise HQ DB 3110, and store the patch 1121 of the LQ image in the perceptible-noise LQ DB 3120. When the average noise feature is determined as a perceptible detail, the AI model training device 2000 may store the patch 1111 of the HQ image in the perceptible-detail HQ DB 3210, and store the patch 1121 of the LQ image in the perceptible-detail LQ DB 3220.

In operation 1150, the AI model training device 2000 may train the perceptible-noise processing model 910 by using the perceptible-noise HQ DB 3110 and the perceptible-noise LQ DB 3120 corresponding thereto. When an LQ image included in the perceptible-noise LQ DB 3120 is input to the perceptible-noise processing model 910, the perceptible-noise processing model 910 may be trained to output an HQ image included in the perceptible-noise HQ DB 3110 corresponding to the LQ image.

In operation 1160, the AI model training device 2000 may train the perceptible-detail processing model 920 by using the perceptible-detail HQ DB 3210 and the perceptible-detail LQ DB 3220 corresponding thereto. When an LQ image included in the perceptible-detail LQ DB 3220 is input to the perceptible-detail processing model 920, the perceptible-detail processing model 920 may be trained to output an HQ image included in the perceptible-detail HQ DB 3210 corresponding to the LQ image.

The perceptible-noise processing model 910 and the perceptible-detail processing model 920 that are trained by the AI model training device 2000 may be used by the image processing device 1000 to process perceptible noise and a perceptible detail of an image, according to various embodiments of the present disclosure.

Figure 12:
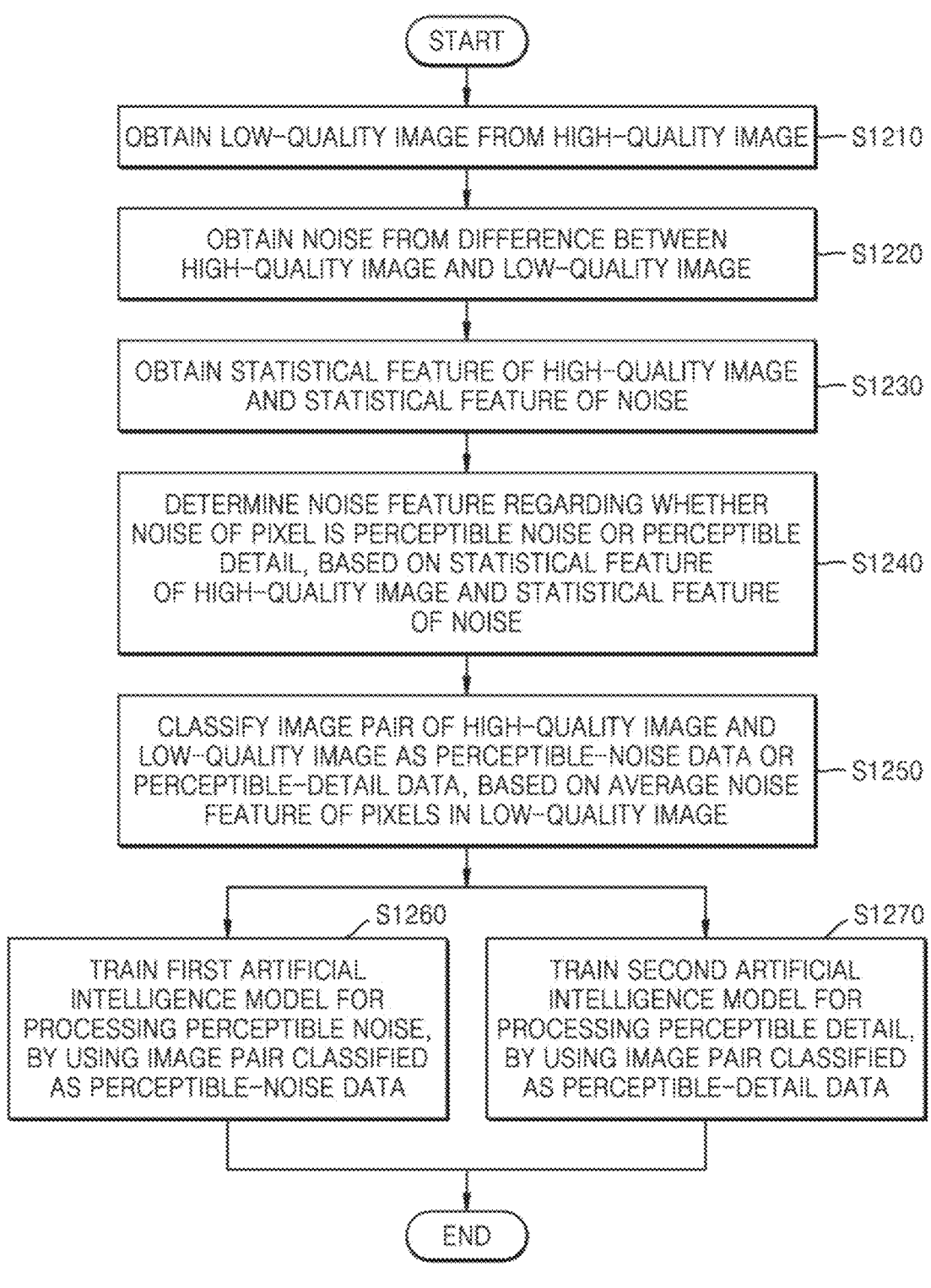
FIG. 12 is a flowchart of an artificial intelligence model training method for training artificial intelligence models to process perceptible noise and a perceptible detail of an image, according to an embodiment.

FIG. 12 is a flowchart of an AI model training method for training AI models to process perceptible noise and a perceptible detail of an image, according to an embodiment. Operations of the AI model training method may be performed by the AI model training device 2000 illustrated in FIG. 13, the AI model training device 2000 illustrated in FIG. 15, or a processor 2300 of the AI model training device 2000.

Referring to FIG. 12, in operation S1210, the AI model training device 2000 may obtain a low-quality image from a high-quality image. In an embodiment, the AI model training device 2000 may obtain the low-quality image by deteriorating the high-quality image. In an embodiment, the AI model training device 2000 may divide each of the high-quality image and the low-quality image into patches having a predetermined size, and perform subsequent operations on each patch.

In operation S1220, the AI model training device 2000 may obtain noise from a difference between the high-quality image and the low-quality image.

In operation S1230, the AI model training device 2000 may obtain a statistical feature of the high-quality image and a statistical feature of the noise, for the area where noise exists.

In an embodiment, the AI model training device 2000 may obtain the statistical feature of the high-quality image. For example, an image processing device may calculate a variance of pixels in the high-quality image. In addition, the AI model training device 2000 may obtain the statistical feature of the noise. For example, the AI model training device 2000 may calculate a variance of pixels in the noise. In an embodiment, the image processing device 1000 may frequency-convert the high-quality image and the noise, and analyze statistical features of results of the frequency-converting.

In an embodiment, the AI model training device 2000 may determine a pixel of the low-quality image for which a noise feature is to be analyzed, and determine an area including the position of the pixel in each of the high-quality image and the noise. The image processing device 1000 may obtain a statistical feature of the area in the high-quality image and a statistical feature of the area in the noise.

In an embodiment, the shape and size of the area may be predetermined. For example, the area may be an area of a size of N×N (N is a natural number) centered on the position of the pixel.

In another embodiment, the shape and size of the area may be adaptively determined according to features of the image or features of an area surrounding the pixel. For example, the AI model training device 2000 may determine the shapes and sizes of the area based on attributes of the image, such as size, color information, motion information, class, tag, encoding method, or storage method. As another example, the AI model training device 2000 may determine the shape and size of the area by analyzing statistical features of the image or the pixel, such as average, variance, or amount of change.

In another embodiment, the shape and size of the area may be set by a user of the AI model training device 2000.

For example, the AI model training device 2000 may receive, from the user, an input for directly setting the size and shape of the area. As another example, the AI model training device 2000 may receive a user input for setting sensitivity, precision, or intensity of detecting and removing perceptible noise, and determine the size and shape of the area based on the user input.

In operation S1240, the AI model training device 2000 may identify a noise feature of the pixel based on the statistical feature of the high-quality image and the statistical feature of the noise.

In an embodiment, the noise feature of the pixel may indicate whether noise of the pixel is perceptible noise or a perceptible detail. For example, the AI model training device 2000 may determine the noise feature of the pixel as a perceptible detail when a difference between the statistical feature of the high-quality image and the statistical feature of the noise is within a predetermined range, and determine the noise feature of the pixel as perceptible noise when the difference between the statistical feature of the high-quality image and the statistical feature of the noise is outside the predetermined range. For example, the noise feature of the pixel may be expressed as 1 when the noise of the pixel corresponds to perceptible noise, and as 0 when the noise of the pixel corresponds to a perceptible detail.

In another embodiment, the noise feature of the pixel may be a feature parameter indicating a degree to which the noise of the pixel corresponds to perceptible noise or a perceptible detail. For example, the AI model training device 2000 may calculate a probability or likelihood that the noise of the pixel is perceptible noise, based on the statistical feature of the high-quality image the statistical feature of the noise. For example, the noise feature of the pixel may be expressed as a value between 0 and 1. The closer the value is to 1, the more the noise of the pixel corresponds to perceptible noise, and the closer the value is to 0, the more the noise of the pixel corresponds to a perceptible detail.

In an embodiment, the AI model training device 2000 may calculate an NVF indicating the visibility of noise for the pixel, based on the statistical feature of the high-quality image and the statistical feature of the noise, according to various embodiments of the present disclosure. In an embodiment, the AI model training device 2000 may determine the noise feature of the pixel based on the calculated NVF value.

In operation S1250, the AI model training device 2000 may classify an image pair of the high-quality image and the low-quality image as perceptible-noise data or perceptible-detail data, based on an average noise feature of pixels in the low-quality image.

In an embodiment, the AI model training device 2000 may obtain the average noise feature of the low-quality image by averaging noise features of pixels in the low-quality image. In an embodiment, the AI model training device may obtain the average noise feature of the low-quality image by averaging NVF values calculated for the respective pixels of the low-quality image. For example, the AI model training device may determine the average noise feature of the low-quality image as perceptible noise when the average NVF value of the low-quality image is greater than or equal to a predetermined threshold, and as a perceptible detail when the average NVF value is less than the threshold. The predetermined threshold may be set to, for example, 0.1. Of course, the present disclosure is not limited to the above example. In an embodiment, the predetermined threshold may be set according to the sensitivity or intensity of determining perceptible noise.

In an embodiment, the AI model training device 2000 may classify the image pair of the high-quality image and the low-quality image as perceptible-noise data or perceptible-detail data, based on the average noise feature of the low-quality image. When the average noise feature is determined as perceptible noise, the AI model training device 2000 may classify and store the image pair as perceptible-noise data. When the average noise feature is determined as a perceptible detail, the AI model training device 2000 may classify and store the image pair as perceptible-detail data.

In operation S1260, the AI model training device 2000 may train a first AI model for processing perceptible noise, by using the image pair classified as perceptible-noise data. When the low-quality image included in the image pair classified as perceptible-noise data is input to the first AI model, the first AI model may be trained to output the high-quality image included in the image pair classified as perceptible-noise data.

In operation S1270, the AI model training device 2000 may train a second AI model for processing a perceptible detail, by using the image pair classified as perceptible-detail data. When the low-quality image included in the image pair classified as perceptible-detail data is input to the second AI model, the second AI model may be trained to output the high-quality image included in the image pair classified as perceptible-detail data.

Figure 13:
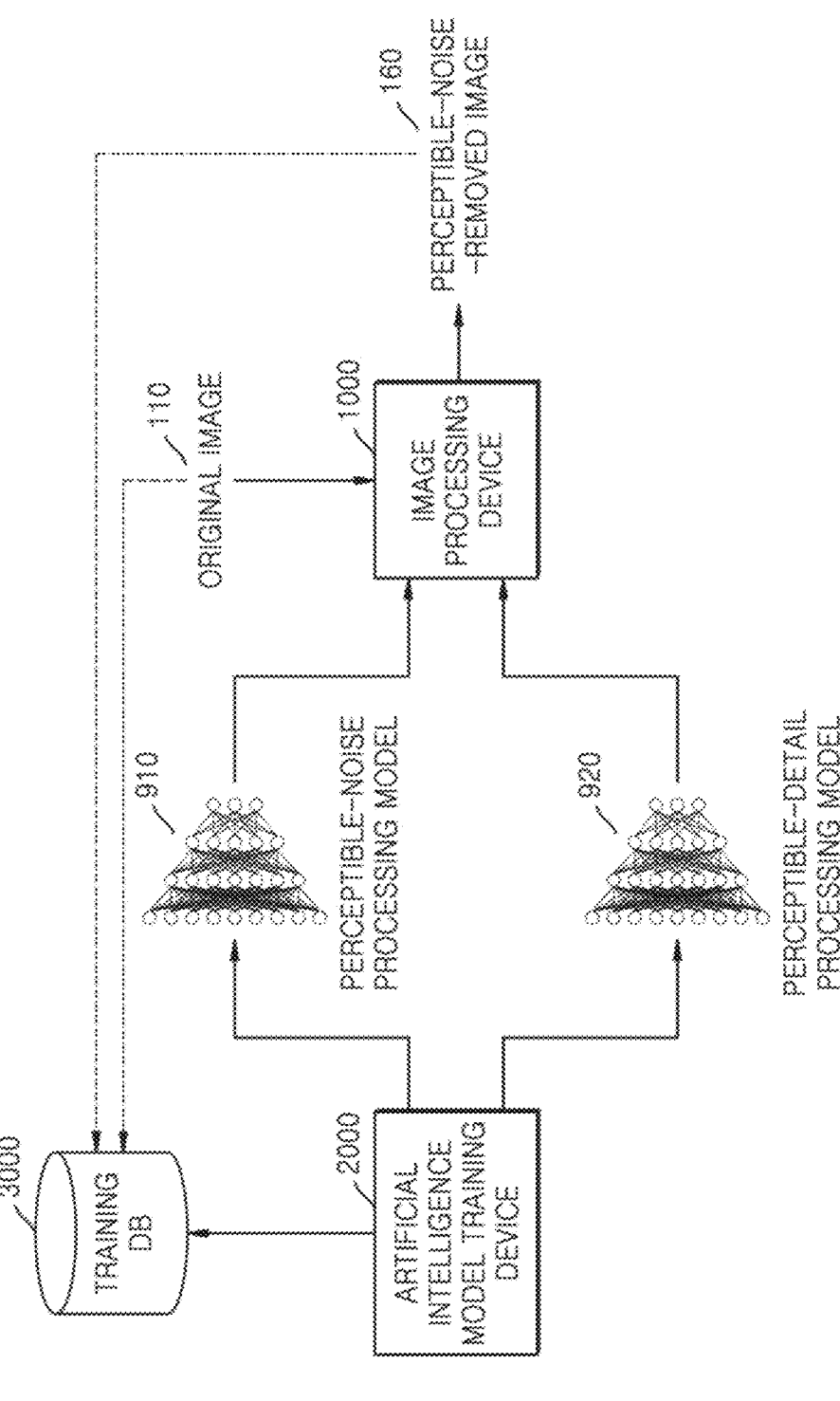
FIG. 13 is a diagram illustrating an image processing system for removing perceptible noise from an image by using artificial intelligence models, according to an embodiment.

FIG. 13 is a diagram illustrating an image processing system for removing perceptible noise from an image by using AI models, according to an embodiment.

FIG. 13 illustrates the image processing device 1000 for detecting and removing perceptible noise by using the perceptible-noise processing model 910 and the perceptible-detail processing model 920, and the AI model training device 2000 for training the perceptible-noise processing model 910 and the perceptible-detail processing model 920 based on the training DB 3000.

The image processing device 1000 may generate the perceptible-noise-removed image 160 obtained by removing perceptible noise from the original image 110, by using the perceptible-noise processing model 910 and the perceptible-detail processing model 920. The perceptible-noise processing model 910 and the perceptible-detail processing model 920 may be pre-trained by the AI model training device 2000. Various embodiments of a detailed method, performed by the image processing device 1000, of removing perceptible noise by using AI models are described above with reference to FIGS. 9 and 10.

The AI model training device 2000 may generate the image pair in the training DB 3000 by generating a low-quality image corresponding to an arbitrary high-quality image by deteriorating the high-quality image, and classifying an image pair of the high-quality image and the low-quality image as perceptible-noise data or perceptible-detail data. The AI model training device 2000 may train the perceptible-noise processing model 910 and the perceptible-detail processing model 920 using the training DB 3000. Various embodiments of a detailed method, performed by the AI model training device 2000, of training an AI model are described above with reference to FIGS. 11 and 12.

According to an embodiment, the image processing device 1000 may update the training DB 3000 with an image pair of the original image 110 and the perceptible-noise-removed image 160. The image processing device 1000 may update the training DB 3000 by using the original image 110 as a low-quality image and the perceptible-noise-removed image 160 as a high-quality image.

In an embodiment, the image processing device 1000 may divide each of the original image 110 and the perceptible-noise-removed image 160 into patches having a predetermined size, and determine an average noise feature of each patch. When the average noise feature of a patch is perceptible noise, the image processing device 1000 may update a perceptible-noise DB included in the training DB 3000, with an image pair of a patch of the original image 110 and a patch of the perceptible-noise-removed image 160 corresponding thereto. When the average noise feature of a patch is a perceptible detail, the image processing device 1000 may update a perceptible-detail DB included in the training DB 3000, with an image pair of a patch of the original image 110 and a patch of the perceptible-noise-removed image 160 corresponding thereto.

According to an embodiment, the AI model training device 2000 may update the perceptible-noise processing model 910 and the perceptible-detail processing model 920 by using the updated training DB 3000.

Figure 14:
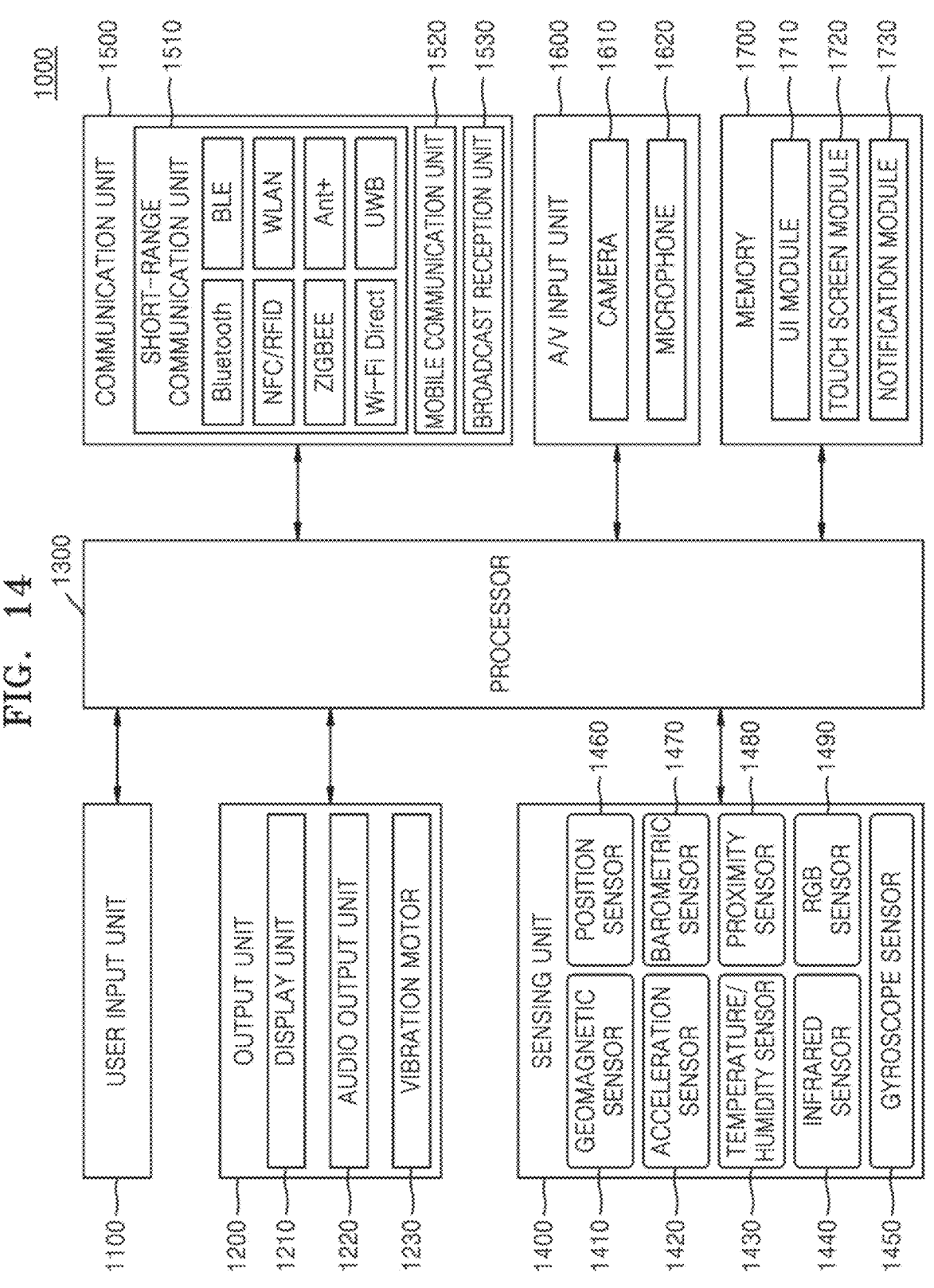
FIG. 14 is a block diagram of an image processing device according to an embodiment.

FIG. 14 is a block diagram of an image processing device according to an embodiment.

As illustrated in FIG. 14, the image processing device 1000 according to some embodiments may include a user input unit 1100, an output unit 1200, the processor 1300, a sensing unit 1400, a communication unit 1500, an audio/video (A/V) input unit 1600, and a memory 1700. However, not all of the components illustrated in FIG. 14 are essential components of the image processing device 1000. The image processing device 1000 may be implemented with more or fewer components than those illustrated in FIG. 14.

The user input unit 1100 is via which the user inputs data for controlling the image processing device 1000. For example, the user input unit 1100 may include, but is not limited to, a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, a jog switch, and the like.

The output unit 1200 may output an audio signal, a video signal, or a vibration signal, and may include a display unit 1210, an audio output unit 1220, and a vibration motor 1230.

The display unit 1210 displays and outputs information processed by the image processing device 1000. For example, the display unit 1210 may display an interface for receiving, from the user, a query input for a plurality of DBs.

In addition, in a case in which the display unit 1210 and a touch pad form a layer structure and thus constitute a touch screen, the display unit 1210 may also be used as an input device in addition to being used as an output device.

The audio output unit 1220 outputs audio data received from the communication unit 1500 or stored in the memory 1700. In addition, the audio output unit 1220 outputs audio signals related to functions performed by the image processing device 1000 (e.g., a call signal reception sound, a message reception sound, or a notification sound). This audio output unit 1220 may include a speaker, a buzzer, and the like.

The vibration motor 1230 may output a vibration signal. For example, the vibration motor 1230 may output a vibration signal corresponding to output of audio data or video data (e.g., a call signal reception sound or a message reception sound). In addition, the vibration motor 1230 may output a vibration signal when a touch is input to the touch screen.

The processor 1300 controls the overall operation of the image processing device 1000. For example, the processor 1300 may execute programs stored in the memory 1700 to control the overall operation of the user input unit 1100, the output unit 1200, the sensing unit 1400, the communication unit 1500, the A/V input unit 1600, and the like. The processor 1300 may control the operations the image processing device 1000 described herein by controlling the user input unit 1100, the output unit 1200, the sensing unit 1400, the communication unit 1500, the A/V input unit 1600, and the like.

In detail, the processor 1300 may obtain a noise-removed image from an image, obtain removed noise from a difference between the image and the noise-removed image, obtain a statistical feature of the noise-removed image and a statistical feature of the noise, identify a noise feature regarding whether noise of a pixel is perceptible noise or a perceptible detail, based on the statistical feature of the noise-removed image and the statistical feature of the noise, and perform a process of removing perceptible noise from the image based on the noise feature of the pixel.

In various embodiments, the processor 1300 may obtain the noise-removed image by filtering the image based on a predetermined rule.

In various embodiments, the processor 1300 may obtain the noise-removed image by applying, to the image, an AI model for removing noise.

In various embodiments, the processor 1300 may determine a pixel in the image for which a noise feature is to be analyzed, determine an area in the noise-removed image corresponding to the position of the pixel, and an area in the removed noise corresponding to the position of the pixel, and obtain a statistical feature of the area in the noise-removed image, and a statistical feature of the area in the removed noise.

In various embodiments, the processor 1300 may, based on a difference between the statistical feature of the noise-removed image and the statistical feature of the noise being within a predetermined range, determine the noise feature of the pixel as a perceptible detail, and based on the difference between the statistical feature of the noise-removed image and the statistical feature of the noise being outside the predetermined range, determine the noise feature of the pixel as perceptible noise.

In various embodiments, the processor 1300 may obtain a feature parameter indicating a degree to which the noise feature of the pixel is perceptible noise or a perceptible detail, based on the statistical feature of the noise-removed image and the statistical feature of the noise.

In various embodiments, the processor 1300 may determine whether the pixel corresponds to an edge, based on an edge map of the image, and based on the pixel corresponding to the edge, determine the noise feature of the pixel as a perceptible detail.

In various embodiments, the processor 1300 may determine the noise feature based on at least one of the size of a screen on which the image is reproduced, the brightness of the screen on which the image is reproduced, or a viewing distance of the image.

In various embodiments, the processor 1300 may obtain directionality of the pixel by analyzing the areas, and determine the noise feature based on the directionality of the pixel.

In various embodiments, the processor 1300 may, based on the noise feature of the pixel being determined as perceptible noise, replace the pixel with a corresponding pixel of the noise-removed image, and based on the noise feature of the pixel being determined as a perceptible detail, maintain the pixel.

In various embodiments, when performing the process of removing the perceptible noise, the processor 1300 may combine the image with the noise-removed image based on the feature parameter of the pixel.

In various embodiments, the processor 1300 may, based on the noise feature of the pixel being determined as perceptible noise, apply, to the pixel, a first AI model for processing perceptible noise, and based on the noise feature of the pixel being determined as a perceptible detail, apply, to the pixel, a second AI model for processing a perceptible detail.

In various embodiments, the processor 1300 may obtain a first modified image by applying, to the image, a first AI model for processing perceptible noise, obtain a second modified image by applying, to the image, a second AI model for processing a perceptible detail, and combine the first modified image with the second modified image based on the feature parameter of the pixel.

The sensing unit 1400 may detect a state of the image processing device 1000 or a state of the periphery of the image processing device 1000, and transmit the detected information to the processor 1300.

The sensing unit 1400 may include, but is not limited to, at least one of a geomagnetic sensor 1410, an acceleration sensor 1420, a temperature/humidity sensor 1430, an infra-red sensor 1440, a gyroscope sensor 1450, a position sensor (e.g., a global positioning system (GPS)) 1460, a barometric sensor 1470, a proximity sensor 1480, and an red-green-blue (RGB) sensor (illuminance sensor) 1490. Functions of the sensors may be intuitively inferred by those of skill in the art from their names, and thus, detailed descriptions thereof will be omitted.

The communication unit 1500 may include one or more components that enable communication with an external device. For example, the communication unit 1500 may include a short-range communication unit 1510, a mobile communication unit 1520, and a broadcast reception unit 1530.

The short-range communication unit 1510 may include, but is not limited to, a Bluetooth communication unit, a Bluetooth Low Energy (BLE) communication unit, a near-field communication (NFC) unit, a Wi-Fi communication unit, a Zigbee communication unit, an Infrared Data Association (IrDA) communication unit, a Wi-Fi Direct (WFD) communication unit, an ultra wideband (UWB) communication unit, an Ant+ communication unit, and the like.

The mobile communication unit 1520 transmits and receives radio signals to and from at least one of a base station, an external terminal, or a server, on a mobile communication network. Here, the radio signals may include a voice call signal, a video call signal, or various types of data according to text/multimedia message transmission and reception.

The broadcast reception unit 1530 receives a broadcast signal and/or broadcast-related information from the outside via a broadcast channel. The broadcast channel may include a satellite channel and a terrestrial channel. Depending on the implementation, the image processing device 1000 may not include the broadcast reception unit 1530.

The A/V input unit 1600 may receive an input of an audio signal or a video signal, and may include a camera 1610, a microphone 1620, and the like. The camera 1610 may obtain an image frame such as a still image or a moving image by using an image sensor, in a video call mode or an image capturing mode. An image captured by the image sensor may be processed by the processor 1300 or a separate image processor (not shown).

An image frame processed by the camera 1610 may be stored in the memory 1700 or transmitted to the outside through the communication unit 1500. Two or more cameras 1610 may be provided depending on the configuration of the image processing device 1000.

The microphone 1620 receives an external audio signal, and processes the received audio signal into electrical voice data. For example, the microphone 1620 may receive an audio signal from an external device or a speaker. The microphone 1620 may perform various denoising algorithms for removing noise occurring when the external audio signal is received.

The memory 1700 may store a program for the processor 1300 to perform processing and control, and may store data input to the image processing device 1000 or output from the image processing device 1000.

The memory 1700 may include at least one of a flash memory-type storage medium, a hard disk-type storage medium, a multimedia card micro-type storage medium, a card-type memory (e.g., SD or XD memory), random-access memory (RAM), static RAM (SRAM), read-only memory (ROM), electrically erasable programmable ROM (EE-PROM), programmable ROM (PROM), magnetic memory, a magnetic disk, and an optical disc.

Programs stored in the memory 1700 may be classified into a plurality of modules according to their functions, for example, into a user interface (UI) module 1710, a touch screen module 1720, a notification module 1730, and the like.

The UI module 1710 may provide a specialized UI, a graphical UI (GUI), or the like that interworks with the image processing device 1000, for each application. The touch screen module 1720 may detect a touch gesture on the touch screen by the user, and transmit information about the touch gesture to the processor 1300. The touch screen module 1720 according to some embodiments may recognize and analyze touch code. The touch screen module 1720 may be configured as separate hardware including a controller.

The notification module 1730 may generate a signal for notifying of the occurrence of an event in the image processing device 1000. The notification module 1730 may output a notification signal in the form of a video signal through the display unit 1210, output a notification signal in the form of an audio signal through the audio output unit 1220, or output a notification signal in the form of a vibration signal through the vibration motor 1230.

Figure 15:
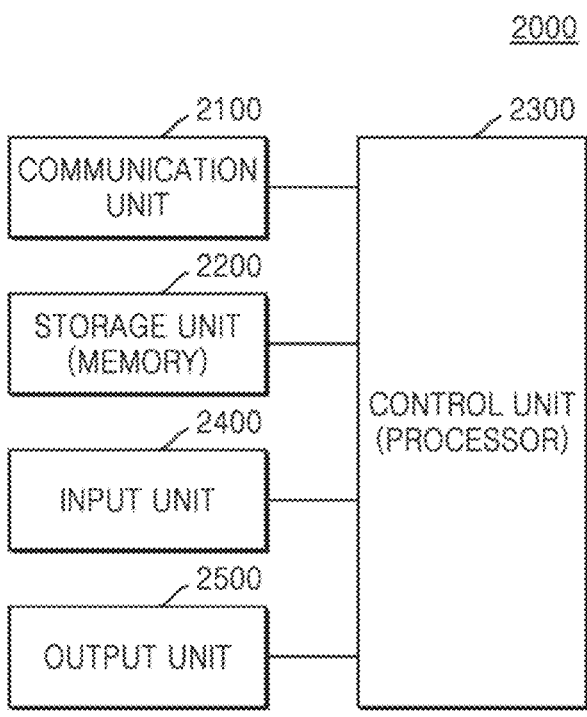
FIG. 15 is a block diagram of an artificial intelligence model training device according to an embodiment.

FIG. 15 is a block diagram of an AI model training device according to an embodiment.

As illustrated in FIG. 15, the AI model training device 2000 according to an embodiment may include a communication unit 2100, a memory 2200, the processor 2300, an input unit 2400, and an output unit 2500. However, not all of the components illustrated in FIG. 15 are essential components of the AI model training device 2000, and the AI model training device 2000 may be implemented with more or fewer components than those illustrated in FIG. 15.

The communication unit 2100 may include one or more components that enable communication with an external device. For example, the communication unit 2100 may include a short-range communication unit, a mobile communication unit, and a broadcast reception unit.

The memory 2200 may store a program for the processor 2300 to perform processing and control, and may store data input to the AI model training device 2000 or output from the AI model training device 2000.

In various embodiments, the memory 2200 may store a training DB. The training DB may include a perceptible-noise DB and a perceptible-detail DB. In various embodiments, the perceptible-noise DB may include image pairs of HQ images and LQ images. The perceptible-noise DB may include a perceptible-noise HQ DB and a perceptible-noise LQ DB corresponding thereto. In various embodiments, the perceptible-detail DB may include image pairs of HQ images and LQ images. The perceptible-detail DB may include a perceptible-detail HQ DB and a perceptible-detail LQ DB corresponding thereto.

The processor 2300 controls the overall operation of the AI model training device 2000. For example, the processor 2300 may execute programs stored in the memory 2200 to control the overall operation of the communication unit 2100, the memory 2200, the input unit 2400, the output unit 2500, and the like. The processor 2300 may control the operation of the AI model training device 2000 described herein by controlling the communication unit 2100, the memory 2200, the input unit 2400, the output unit 2500, and the like.

In detail, the processor 2300 may obtain a low-quality image from a high-quality image, obtain noise from a difference between the low-quality image and the high-quality image, obtain a statistical feature of the high-quality image and a statistical feature of the noise, identify a noise feature regarding whether noise of a pixel is perceptible noise or a perceptible detail, based on the statistical feature of the high-quality image and the statistical feature of the noise, classify an image pair of the high-quality image and the low-quality image as perceptible-noise data or perceptible-detail data based on an average noise feature of pixels in the low-quality image, train a first AI model for processing perceptible noise by using the image pair classified as perceptible-noise data, and train a second AI model for processing a perceptible detail by using the image pair classified as perceptible-detail data.

In various embodiments, the processor 2300 may obtain the low-quality image by deteriorating the high-quality image.

In various embodiments, the processor 2300 may divide the high-quality image and the low-quality image into patches having a predetermined size.

In various embodiments, the processor 2300 may train the first AI model to, based on the low-quality image included in the image pair classified as perceptible-noise data being input into the first AI model, output the high-quality image included in the image pair classified as perceptible-noise data, and train the second AI model to, based on the low-quality image included in the image pair classified as perceptible-detail data being input into the second AI model, output the high-quality image included in the image pair classified as perceptible-detail data.

The input unit 2400 refers to a unit via which a user inputs data for controlling the processor 2300. For example, the input unit 2400 may include, but is not limited to, a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, a jog switch, and the like.

The output unit 2500 may output an audio signal, a video signal, or a vibration signal, and may include a display unit and an audio output unit.

A machine-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the 'non-transitory storage medium' may include a buffer in which data is temporarily stored.

According to an embodiment, methods according to various embodiments disclosed herein may be included in a computer program product and then provided. The computer program product may be traded as commodities between sellers and buyers. The computer program product may be distributed in the form of a machine-readable storage medium (e.g., a compact disc ROM (CD-ROM)), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

An image processing method disclosed as a technical unit for achieving the above-described technical objects may include: obtaining a noise-removed image from an image; obtaining removed noise from a difference between the image and the noise-removed image; obtaining a statistical feature of the noise-removed image and a statistical feature of the noise; determining a noise feature regarding whether noise of a pixel is perceptible noise or a perceptible detail, based on the statistical feature of the noise-removed image and the statistical feature of the noise; and performing a process of removing perceptible noise from the image based on the noise feature of the pixel.

The obtaining of the noise-removed image may include obtaining the noise-removed image by filtering the image based on a predetermined rule.

The obtaining of the noise-removed image may include obtaining the noise-removed image by applying, to the image, an AI model for removing noise.

The obtaining of the statistical feature of the noise-removed image and the statistical feature of the noise may includes determining a pixel in the image for which a noise feature is to be analyzed, determining an area in the noise-removed image corresponding to a position of the pixel, and an area in the removed noise corresponding to the position of the pixel, and obtaining a statistical feature of the area in the noise-removed image, and a statistical feature of the area in the removed noise.

The determining of the noise feature may include, based on a difference between the statistical feature of the noise-removed image and the statistical feature of the noise being within a predetermined range, determining the noise feature of the pixel as a perceptible detail, and based on the difference between the statistical feature of the noise-removed image and the statistical feature of the noise being outside the predetermined range, determining the noise feature of the pixel as perceptible noise.

The determining of the noise feature may include obtaining a feature parameter indicating a degree to which the noise feature of the pixel is perceptible noise or a perceptible detail, based on the statistical feature of the noise-removed image and the statistical feature of the noise.

The determining of the noise feature may includes determining whether the pixel corresponds to an edge, based on an edge map of the image, and based on the pixel corresponding to the edge, determining the noise feature of the pixel as a perceptible detail.

The determining of the noise feature may include determining the noise feature based on at least one of the size of a screen on which the image is reproduced, the brightness of the screen on which the image is reproduced, or a viewing distance of the image.

The obtaining of the noise feature may includes obtaining directionality of the pixel by analyzing the areas, and determining the noise feature based on the directionality of the pixel.

The performing of the process of removing the perceptible noise may include, based on the noise feature of the pixel being determined as perceptible noise, replacing the pixel with a corresponding pixel of the noise-removed image, and based on the noise feature of the pixel being determined as a perceptible detail, maintaining the pixel.

The performing of the process of removing the perceptible noise may include combining the image with the noise-removed image based on the feature parameter of the pixel.

The performing of the process of removing the perceptible noise may includes, based on the noise feature of the pixel being determined as perceptible noise, applying, to the pixel, a first artificial intelligence model for processing perceptible noise, and based on the noise feature of the pixel being determined as a perceptible detail, applying, to the pixel, a second artificial intelligence model for processing a perceptible detail.

The performing of the process of removing the perceptible noise may include obtaining a first modified image by applying, to the image, a first artificial intelligence model for processing perceptible noise, obtaining a second modified image by applying, to the image, a second artificial intelligence model for processing a perceptible detail, and combining the first modified image with the second modified image based on the feature parameter of the pixel.

An AI model training method disclosed as a technical unit for achieving the above-described technical objects may include: obtaining a low-quality image from a high-quality image; obtaining noise from a difference between the low-quality image and the high-quality image; obtaining a statistical feature of the high-quality image and a statistical feature of the noise; determining a noise feature regarding whether noise of a pixel is perceptible noise or a perceptible detail, based on the statistical feature of the high-quality image and the statistical feature of the noise; classifying an image pair of the high-quality image and the low-quality image as perceptible-noise data or perceptible-detail data based on an average noise feature of pixels in the low-quality image; training a first AI model for processing perceptible noise by using the image pair classified as perceptible-noise data; and training a second AI model for processing a perceptible detail by using the image pair classified as perceptible-detail data.

The obtaining of the low-quality image from the high-quality image may include obtaining the low-quality image by deteriorating the high-quality image.

The obtaining of the low-quality image from the high-quality image may include dividing the high-quality image and the low-quality image into patches having a predetermined size.

The training of the first AI model may include training the first AI model to, based on the low-quality image included in the image pair classified as perceptible-noise data into the first AI model, output the high-quality image included in the image pair classified as perceptible-noise data, and the training of the second AI model may include training the second AI model to, based on the low-quality image included in the image pair classified as perceptible-detail data into the second AI model, output the high-quality image included in the image pair classified as perceptible-detail data.

An image processing device disclosed as a technical unit for achieving the above-described technical objects may include: a memory storing one or more instructions; and at least one processor configured to execute the one or more instructions to obtain a noise-removed image from an original image, obtain removed noise from a difference between the image and the noise-removed image, obtain a statistical feature of the noise-removed image and a statistical feature of the noise, identify a noise feature regarding whether noise of a pixel is perceptible noise or a perceptible detail, based on the statistical feature of the noise-removed image and the statistical feature of the noise, and perform a process of removing perceptible noise from the original image based on the noise feature of the pixel.

An AI model training device disclosed as a technical unit for achieving the above-described technical objects may include: a memory storing one or more instructions; and at least one processor configured to execute the one or more instructions to obtain a low-quality image from a high-quality image, obtain noise from a difference between the low-quality image and the high-quality image, obtain a statistical feature of the high-quality image and a statistical feature of the noise, identify a noise feature regarding whether noise of a pixel is perceptible noise or a perceptible detail, based on the statistical feature of the high-quality image and the statistical feature of the noise, based on an average noise feature of pixels in the low-quality image, classify an image pair of the high-quality image and the low-quality image as perceptible-noise data or perceptible-detail data, train a first artificial intelligence model for processing perceptible noise by using image pairs classified as perceptible-noise data, and train a second artificial intelligence model for processing a perceptible detail by using the image pair classified as perceptible-detail data.

A recording medium disclosed as a technical unit for achieving the above-described technical objects may have recorded thereon a program for executing, on a computer, at least one of embodiments of the disclosed method.

There may be provided a computer-readable recording medium having recorded thereon a program for executing, on a computer, an image processing method, the image processing method including obtaining a noise-removed image from an image, obtaining removed noise from a difference between the image and the noise-removed image, obtaining a statistical feature of the noise-removed image and a statistical feature of the noise, determining a noise feature regarding whether noise of a pixel is perceptible noise or a perceptible detail, based on the statistical feature of the noise-removed image and the statistical feature of the noise, and performing a process of removing perceptible noise from the image based on the noise feature of the pixel.

There may be provided a computer-readable recording medium having recorded thereon a program for executing, on a computer, an AI model training method, the AI model training method including obtaining a low-quality image from a high-quality image, obtaining noise from a difference between the low-quality image and the high-quality image, obtaining a statistical feature of the high-quality image and a statistical feature of the noise, determining a noise feature regarding whether noise of a pixel is perceptible noise or a perceptible detail, based on the statistical feature of the high-quality image and the statistical feature of the noise, classifying an image pair of the high-quality image and the low-quality image as perceptible-noise data or perceptible-detail data based on an average noise feature of pixels in the low-quality image, training a first AI model for processing perceptible noise by using the image pair classified as perceptible-noise data, and training a second AI model for processing a perceptible detail by using the image pair classified as perceptible-detail data.

While the present disclosure have been particularly shown and described, it will be understood by one of ordinary skill in the art that various changes in form and details may be made therein without departing from the spirit and scope of the present disclosure. Therefore, it should be understood that the above-described embodiments are exemplary in all respects and do not limit the scope of the present disclosure. For example, each element described in a single type may be executed in a distributed manner, and elements described distributed may also be executed in an integrated form.

The scope of the present disclosure is not defined by the detailed description of the present disclosure but by the following claims, and all modifications or alternatives derived from the scope and spirit of the claims and equivalents thereof fall within the scope of the present disclosure.

What is claimed is:
1. An image processing method comprising:
obtaining a noise-removed image from an image;
obtaining removed noise from a difference between the image and the noise-removed image;
obtaining a statistical feature of the noise-removed image and a statistical feature of the removed noise;
identifying a noise feature based on the statistical feature of the noise-removed image and the statistical feature of the removed noise, wherein the noise feature indicates whether the removed noise of a pixel of the image is perceptible noise or perceptible detail; and
removing perceptible noise from the image based on the noise feature.
2. The image processing method of claim 1, wherein the obtaining the noise-removed image comprises filtering the image based on a predetermined rule.
3. The image processing method of claim 1, wherein the obtaining the noise-removed image comprises applying, to the image, an artificial intelligence model configured to remove noise.
4. The image processing method of claim 1, wherein the obtaining the statistical feature of the noise-removed image and the statistical feature of the removed noise comprises:
identifying the pixel in the image;
identifying an area in the noise-removed image corresponding to a position of the pixel and an area in the removed noise corresponding to the position of the pixel; and
obtaining a statistical feature of the area in the noise-removed image and a statistical feature of the area in the removed noise.
5. The image processing method of claim 4, wherein the identifying the noise feature comprises:
obtaining directionality of the pixel by analyzing the area in the noise-removed image and the area in the removed noise; and
identifying the noise feature based on the directionality of the pixel.
6. The image processing method of claim 1, wherein the identifying the noise feature comprises:

based on a difference between the statistical feature of the noise-removed image and the statistical feature of the removed noise being within a predetermined range, identifying the noise feature of the pixel as perceptible detail; and based on the difference between the statistical feature of the noise-removed image and the statistical feature of the removed noise being outside the predetermined range, identifying the noise feature of the pixel as perceptible noise.

7. The image processing method of claim 1, wherein the identifying the noise feature comprises obtaining a feature parameter indicating a degree to which the noise feature of the pixel is perceptible noise or perceptible detail, based on the statistical feature of the noise-removed image and the statistical feature of the removed noise.

8. The image processing method of claim 7, wherein the removing perceptible noise comprises combining the image with the noise-removed image based on the feature parameter.

9. The image processing method of claim 7, wherein the removing perceptible noise comprises:

obtaining a first modified image by applying, to the image, a first artificial intelligence model configured to process perceptible noise;

obtaining a second modified image by applying, to the image, a second artificial intelligence model configured to process perceptible detail; and combining the first modified image with the second modified image based on the feature parameter of the pixel.

10. The image processing method of claim 1, wherein the identifying the noise feature comprises:

identifying whether the pixel corresponds to an edge, based on an edge map of the image; and based on the pixel corresponding to the edge, identifying the noise feature of the pixel as perceptible detail.

11. The image processing method of claim 1, wherein the identifying the noise feature comprises identifying the noise feature based on at least one of a size of a screen on which the image is reproduced, a brightness of the screen on which the image is reproduced, or a viewing distance of the image.

12. The image processing method of claim 1, wherein the removing perceptible noise comprises:

based on identifying the noise feature as perceptible noise, replacing the pixel with a corresponding pixel of the noise-removed image.

13. The image processing method of claim 1, wherein the removing perceptible noise comprises:

based on identifying the noise feature of the pixel as perceptible noise, applying, to the pixel, a first artificial intelligence model configured to process perceptible noise; and based on identifying the noise feature of the pixel as perceptible detail, applying, to the pixel, a second artificial intelligence model configured to process perceptible detail.

14. An image processing device comprising:

at least one memory storing one or more instructions; and at least one processor configured to execute the one or more instructions, wherein the at least one processor is configured to execute the one or more instructions to cause the image processing device to:

obtain a noise-removed image from an image, obtain removed noise from a difference between the image and the noise-removed image, obtain a statistical feature of the noise-removed image and a statistical feature of the removed noise, identify a noise feature based on the statistical feature of the noise-removed image and the statistical feature of the removed noise, wherein the noise feature indicates whether the removed noise of a pixel of the image is perceptible noise or perceptible detail, and remove perceptible noise from the image based on the noise feature of the pixel.

15. A non-transitory computer readable medium having instructions stored therein, which when executed by at least one processor cause the at least one processor to execute an image processing method, the image processing method comprising:

obtaining a noise-removed image from an image;

obtaining removed noise from a difference between the image and the noise-removed image;

obtaining a statistical feature of the noise-removed image and a statistical feature of the removed noise;

identifying a noise feature based on the statistical feature of the noise-removed image and the statistical feature of the removed noise, wherein the noise feature indicates whether the removed noise of a pixel of the image is perceptible noise or perceptible detail; and removing perceptible noise from the image based on the noise feature.

* * * * *